(12) United States Patent
Takagi

(10) Patent No.: US 6,238,151 B1
(45) Date of Patent: May 29, 2001

(54) DRILLING TOOL AND THROW-AWAY TIP FOR USE IN DRILLING WORK

(75) Inventor: Nobuyuki Takagi, Gifu-ken (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/384,364

(22) Filed: Aug. 27, 1999

(30) Foreign Application Priority Data

Sep. 28, 1998 (JP) .................................................. 10-274000
Feb. 23, 1999 (JP) .................................................. 11-045482

(51) Int. Cl.$^7$ .................................................. B23B 51/02
(52) U.S. Cl. .................... 408/230; 407/114; 407/115; 407/116; 408/223; 408/713
(58) Field of Search .................................... 407/114, 115, 407/116; 408/223, 227, 229, 230, 713

(56) References Cited

U.S. PATENT DOCUMENTS

| | | |
|---|---|---|
| 4,340,327 | 7/1982 | Martins . |
| 4,373,839 | 2/1983 | Negishi et al. . |
| 4,486,127 * | 12/1984 | Eckle ..................... 407/114 |
| 4,565,471 * | 1/1986 | Negishi et al. .................. 408/204 |
| 4,687,388 | 8/1987 | Yokota et al. . |
| 4,755,086 * | 7/1988 | Stashko ................. 407/114 |
| 5,044,840 * | 9/1991 | Fouquer et al. ............... 407/114 |
| 5,092,718 | 3/1992 | Shallenberger . |
| 5,509,761 * | 4/1996 | Grossman et al. ................... 408/230 |
| 5,816,754 * | 10/1998 | Shallenberger ...................... 408/713 |
| 5,829,927 * | 11/1998 | Nakamura et al. .................. 408/230 |
| 5,967,710 * | 10/1999 | Krenzer ............... 408/713 |
| 6,024,519 * | 2/2000 | Okui et al. ........................ 407/113 |

FOREIGN PATENT DOCUMENTS

| | | | |
|---|---|---|---|
| 0374800 * | 6/1990 | (EP) | ....................... 407/114 |
| 2092032 * | 8/1982 | (GB) | ....................... 407/114 |
| 60-9609 | 1/1985 | (JP) . | |
| 62-213912 | 9/1987 | (JP) . | |
| 63-229212 | 9/1988 | (JP) . | |

\* cited by examiner

*Primary Examiner*—Daniel W. Howell
(74) *Attorney, Agent, or Firm*—Oblon, Spivak, McClelland, Maier & Neustadt, P.C.

(57) ABSTRACT

A drilling tool including a substantially columnar tool body rotatable about an axis, the tool body having a chip discharge groove formed in the outer periphery thereof opened at a distal end surface of the tool body; and a cutting edge having a rake face and extending from an end adjacent to the axis toward the outer periphery of the tool provided along a crossing ridge between a wall surface of the chip discharge groove facing in a circumferential direction of the tool and the distal end face. In the drilling tool, a concave surface rises in the circumferential direction of the tool with respect to the rake face of the cutting edge, the concave surface forming a concave curve advancing toward the distal end face of the tool in the circumferential direction of the tool, the concave surface being formed between the crossing ridge and the distal end face.

11 Claims, 17 Drawing Sheets

Fig,24
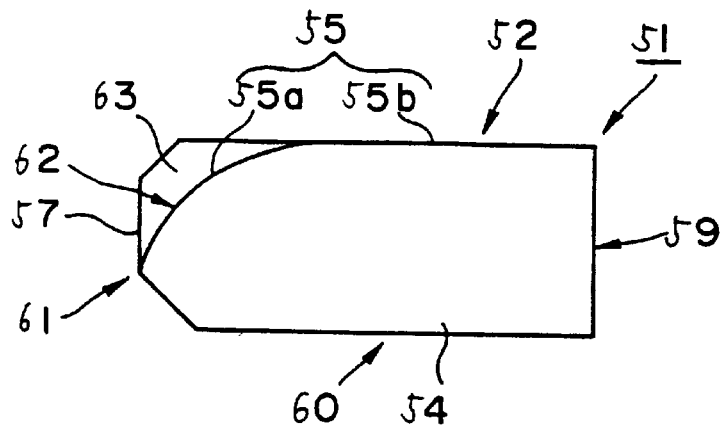
Fig,25
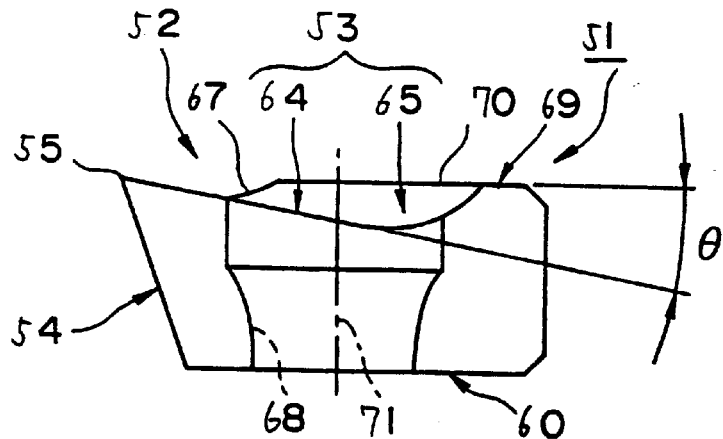
Fig,26
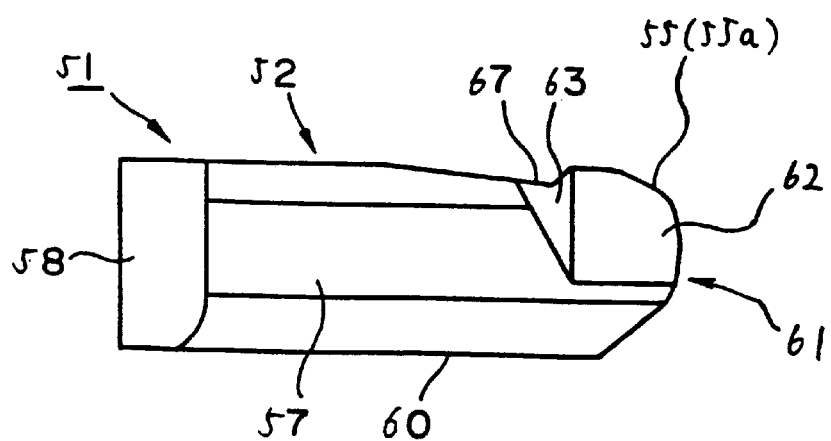

Fig,28
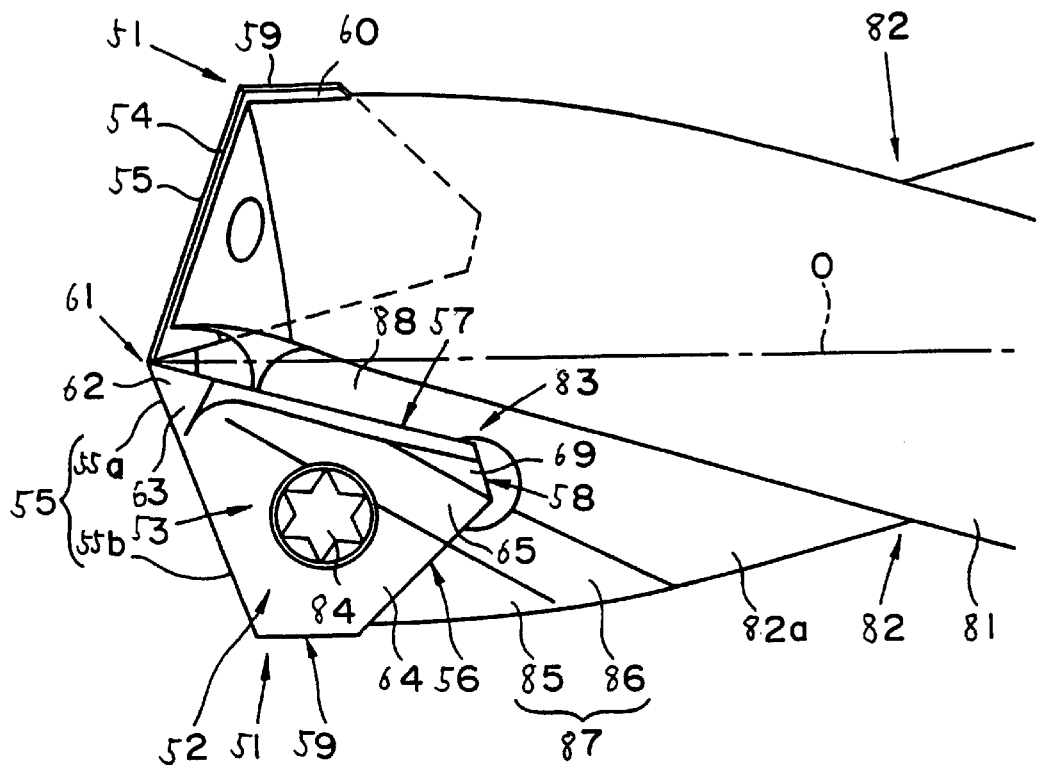
Fig,29
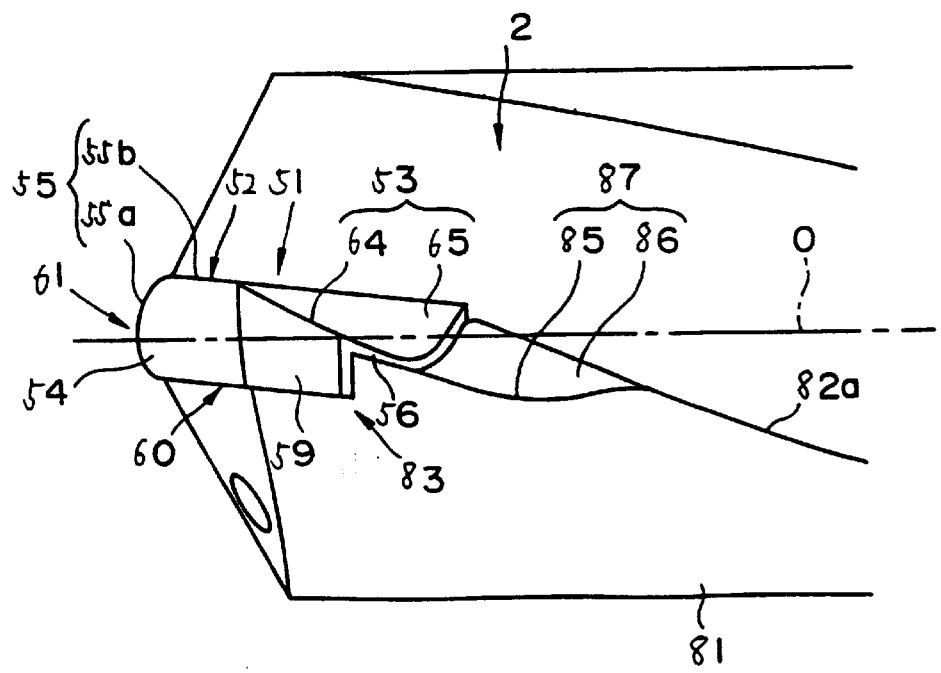

Fig,30
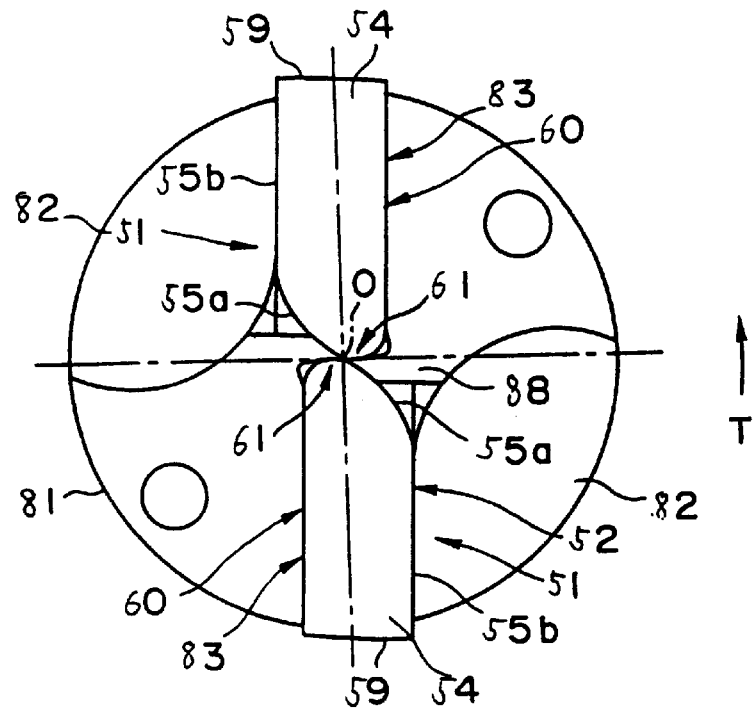
Fig,31
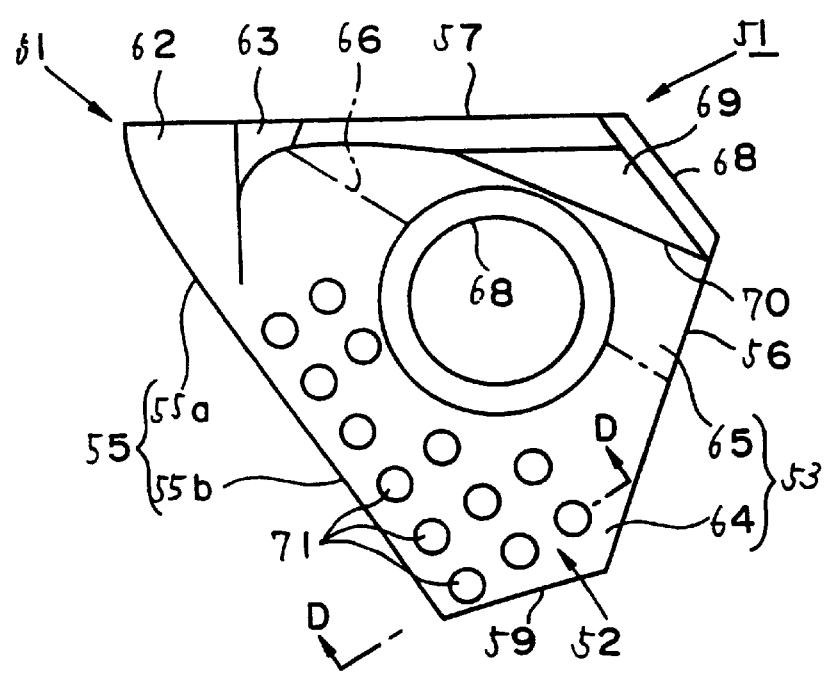

DRILLING TOOL AND THROW-AWAY TIP FOR USE IN DRILLING WORK

BACKGROUND OF THE INVENTION

1. Field of the Invention

The present invention relates to a drilling tool having a cutting tool provided at a distal end of a tool body for use in drilling a workpiece, and to a throw-away tip suitable for use in drilling work.

The present invention claims priority to Japanese Patent Applications HEI 10-274000, filed on Sep. 28, 1998, and HEI 11-045482, filed on Feb. 23, 1999, and these applications are hereby incorporated by reference.

2. Description of the Related Art

As a drilling tool of this type, the inventors of the present invention propose, for example, in Japanese Unexamined Patent Publication No. 10-118820, a drilling tool in which substantially triangular planar chips are mounted respectively on distal ends of wall surfaces of a pair of chip discharge grooves facing in the direction of rotation of a tool, the pair of chip discharge grooves are formed in an outer periphery of the distal end of a tool body rotated around its axis, a pair of cutting edges whose inner peripheral ends are spaced from the axis toward the outer periphery of the tool are provided, a recess recessed between the inner peripheral ends of the cutting edges toward the rear end of the tool along the axis is formed in the center of the distal end of the tool body, and the bottom surface of the recess is formed into a shape of an inclined surface inclined toward the axis. In such a drilling tool, the inner peripheral ends of the cutting edges are spaced from the axis of the tool body toward the outer periphery of the tool, whereby a core of a workpiece will grow along the axis during drilling. However, the core can be guided by the inclined bottom surface of the recess, and can be securely discharged to the chip discharge grooves.

Incidentally, not only in drilling using a drilling tool in which the core grows during drilling, but also with a common twist drill, a site of a drilling is at a bottom of a closed hole, so that it is important to securely curl and smoothly treat chips produced by the cutting edges at the site of drilling during drilling. In this case, however, the distance is short between the end of the cutting edge adjacent to the inner periphery of the tool, that is, in the vicinity of the center of the distal end of the tool body and the axis to be the center of rotation of the tool during drilling, cutting speed is lowered, drilling form is such that the cutting edge crushes and picks up the workpiece rather than cutting, and chips are formed in sheared shapes instead of flowing shapes that are difficult to curl, so that chip packing easily occurs. Moreover, particularly in the drilling tool in which the core grows during drilling as disclosed in the above Japanese Unexamined Patent Publication, the core is discharged toward the center of the distal end of the tool body where chip packing easily occurs, so that a smooth chip treatment may be further obstructed.

In addition, as the throw-away drilling tool in which tips are detachably mounted as described above, a drilling tool disclosed in, for example, Japanese Unexamined Patent Publication No. 4-269108, Japanese Unexamined Utility Model Publication No. 1-81210, and Japanese Unexamined Patent Publication Nos. 9-262711 and 9-295212 are also known. That is, in the drilling tool disclosed in the above Japanese Unexamined Patent and Utility Model Publications, a pair of chip discharge grooves is formed in a distal end of a tool body to be rotated around its axis on both sides of the axis of the tool body, and substantially triangular planar tips are mounted on tip-mounting seats formed on the chip discharge grooves adjacent to the distal end of the tool such that one of the triangular surfaces is located as a rake face to face in the direction of rotation of the tool and the other one triangular surface is seated as a seat face on the bottom surface of the tip-mounting seat facing in the direction of rotation of the tool, one of the side surfaces disposed around the triangular surfaces is located as an end flank face to face the distal end of the tool, and the remaining two side surfaces are brought into abutment with wall surfaces of the tip-mounting seats facing the outer periphery of the tool and the inner periphery of the tool, respectively. A cutting edge is formed along a crossing ridge between the rake face and the end flank face, and the cutting edge is disposed in such a manner that the inner peripheral end thereof is located in the vicinity of the axis at the distal end of the tool, that is, in the vicinity of the center of rotation of the tool, and the cutting edge is inclined toward the rear end of the tool as it proceeds toward the outer periphery of the tool.

In the drilling tool disclosed in these Japanese Unexamined Patent and Utility Model Publications, the rake face of the tip is disposed such that it is in parallel with the axis of the tool body, or it is inclined in the direction of rotation of the tool as it proceeds toward the rear end of the tool, and an axial rake angle thereof is set to 0° or as a negative angle. For this reason, the cutting resistance during drilling is large, a large driving force is required for rotationally driving the tool body, and chatter or vibration is likely to occur in the tool body, resulting in deterioration of the precision of a drilled hole, such as an increase in an enlarged margin.

On the other hand, in order to solve such problems, when the rake face is disposed so as to be inclined rearward in the direction of rotation of the tool as it proceeds toward the rear end of the tool so that a positive rake angle is formed, the wall surface of the tip-mounting seat facing the outer periphery of the tool is also inclined rearward in the direction of rotation of the tool as it proceeds toward the rear end of the tool, and consequently, a thin wall is formed between the wall surfaces of both tip-mounting seats provided at the distal ends of the pair of chip discharge grooves, that is, at a core diameter portion of the distal end of the tool body, along the axis of the tool body. When such a thin wall is formed at the core diameter portion of the distal end of the tool body, the strength of the tool body at the wall may be greatly impaired and the tool body may be damaged during drilling, resulting in shortened life of the tool.

Furthermore, in the tips disclosed in the above Japanese Unexamined Patent and Utility Model Publications, a breaker groove for curling and treating chips produced during drilling is formed on an edge of the rake face adjacent to the cutting edge. In the tips, however, since the breaker groove is a narrow groove formed on the edge of the rake face adjacent to the cutting edge as described above, when slightly elongated chips are produced according to a drilling condition, the chips pass over the breaker groove so that they cannot be securely curled. In addition, even if the chips are brought into sliding contact with the bottom surface of the groove without passing over the breaker groove, in order to sufficiently curl the chips by the narrow breaker groove, a large resistance must be given to the chips by, for example, reducing the radius of curvature of the bottom surface of the groove to suddenly change the outflow direction of the chips, resulting in an increase in the cutting resistance received by the tool body during drilling.

The present invention has been achieved in view of the background set forth above. Firstly, an object of the present invention is to provide a drilling tool capable of increasing chip treatment ability particularly in the vicinity of the center of the distal end of the tool body, and capable of preventing the occurrence of chip packing even in a drilling tool in which a core grows during drilling. Secondly, another object of the present invention is to provide a drilling tool including tips mounted to a pair of tip-mounting seats, formed on a distal end of a tool body on both sides of an axis, capable of reducing cutting resistance during drilling to decrease rotational driving force of the tool body while ensuring the strength of the distal end of the tool body at its core diameter portion, and which is capable of increasing the precision of a drilled hole by suppressing chatter and vibration. Thirdly, another object of the present invention is to provide a tip, particularly for use in drilling, capable of curling chips securely, and capable of reducing the cutting resistance at the time of drilling.

SUMMARY OF THE INVENTION

According to a first aspect of the present invention, there is provided a drilling tool including a substantially columnar tool body rotating about its axis, the tool body having a chip discharge groove formed in the outer periphery thereof opened at a distal end face of the tool body; and a cutting edge extending from the inner periphery of the tool toward the outer periphery of the tool provided along a crossing ridge between a wall surface of the chip discharge groove facing in a direction of rotation of the tool and the distal end face, wherein a concave surface rising in the direction of rotation of the tool with respect to a rake face of the cutting edge connected to an inner peripheral end of the tool, and proceeding toward the distal end of the tool while forming a concave curve in the direction of rotation of the tool is formed on the crossing ridge between the wall surface of the chip discharge groove facing rearward in the direction of rotation of the tool and the distal end face adjacent to the inner periphery of the tool.

Therefore, according to the thus-constructed drilling tool, chips produced in the vicinity of the center of the distal end of the tool body by an end of the cutting edge adjacent to the inner periphery of the tool flow out in the shape of a fan toward the inner periphery of the tool about an inner peripheral end of the cutting edge, abrades the rake face connected to the end of the cutting edge adjacent to the inner periphery of the tool, and are pressed to the concave surface rising on the rake face in the direction of rotation of the tool. The concave surface is formed so as to proceed toward the distal end of the tool while forming a concave curve, so that the chips pressed to the concave surface are curved along the concave surface, are rolled into conical shapes toward the arc of the fan into which the flowing chips are formed, and are securely curled. For this reason, even if a core grows during drilling, occurrence of chip packing can be prevented, and smooth chip treatment can be achieved.

Here, as in the drilling tool disclosed in the above Japanese Unexamined Patent Publication, when a plurality of cutting edges are provided on the tool body, the inner peripheral ends of the cutting edges are spaced from the axis toward the outer periphery of the tool, and the recess recessed between the inner peripheral ends of the cutting edges toward the rear end of the tool along the axis is formed in the center of the distal end of the tool body, the recess is formed so as to extend toward the distal end of the tool while forming a concave curve from the outer periphery to the inner periphery of the tool to be connected to the bottom surface of the recess facing the distal end of the tool, whereby a core of a workpiece growing along the axis of the tool body during drilling can be guided by the bottom surface of the recess, and can be smoothly discharged from the concave surface to the chip discharge grooves.

In addition, in order to curl more securely and treat more smoothly the chips, the concave surface may preferably be formed so that it is flush with the rake face of the cutting edge connected to the inner peripheral end of the tool, it is recessed by one step from the rake face, or it is connected to the rake face via a step portion projecting one step in an amount of projection of 1 mm or less. If the concave surface projects from the rake face through a step portion exceeding 1 mm, the chips that abrade the rake face to flow out in the shape of a fan may collide with the step portion to cause chip packing.

According to a second aspect of the present invention, there is provided a drilling tool including a substantially columnar tool body rotating about an axis, the tool body having a pair of chip discharge grooves formed in the outer periphery thereof on both sides of the axis opened at a distal end face of the tool body; tip-mounting seats formed at respective distal ends of wall surfaces of the chip discharge grooves facing in the direction of rotation of the tool; and a pair of throw-away tips detachably mounted on the tip-mounting seats with the inner peripheral ends of the cutting edges thereof being located in the vicinity of the center of rotation of the tool of the distal end of the tool body, wherein the throw-away tips are formed as a substantially triangular plate and are mounted to the tip-mounting seats such that triangular surfaces thereof are located as rake faces to face in the direction of rotation of the tool while forming a positive axial rake angle of 7° to 15° with respect to the axis, and side surfaces located to face the inner periphery of the tool are brought into abutment with wall surfaces of the tip-mounting seats facing the outer periphery of the tool, and wherein the wall surfaces of the tip-mounting seats facing the outer periphery of the tool are inclined toward the outer periphery of the tool while forming an angle of inclination of 10° to 20° with respect to the axis as they proceed toward the rear end of the tool.

Therefore, according to the above drilling tool, a positive axial rake angle is given to the rake faces of the tips, so that cutting resistance during drilling is reduced, rotational driving force is decreased, and chatter vibration is prevented, whereby the precision of a drilled hole can be improved. On the other hand, the wall surfaces of the tip-mounting seats facing the outer periphery of the tool are inclined toward the outer periphery of the tool as they proceed toward the rear end of the tool, so that the thickness of the wall formed between the wall surfaces of the tip-mounting seats can be increased toward the rear end of the tool to be sufficiently ensured, whereby the strength of the core diameter portion of the distal end of the tool can be ensured to prevent the damage thereof, and extension of the tool life can be achieved.

Here, in the second aspect of the invention, the axial rake angle is set to 7° to 15°. This is because the effect of reducing the cutting resistance is not sufficient when the axial rake angle is small to such an extent as to fall short of 7°, and a sufficient thickness of the wall surfaces, particularly adjacent to the distal end of the wall, may not be ensured when the axial rake angle is large to such an extent as to exceed 15° although the wall surfaces of the tip-mounting seat are inclined. In addition, the angle of inclination is set to 10° to 20°. This is because the thickness of the wall may not be sufficiently ensured when the angle of inclination is small to such an extent as to fall short of 10°, and the width of the other wall surface may be reduced and the tips may be instably mounted.

Incidentally, in the thus-constructed drilling tool according to the second aspect of the invention, when the side surfaces of the throw-away tips located to face the inner periphery of the tool are formed so that portions thereof adjacent to the distal end of the tool are bent at an obtuse angle as viewed from the direction opposite to the rake faces, the strength of the tip on the inner periphery of the cutting edge crossing the portions of the side surfaces adjacent to the distal end of the tool can be improved, and the inner peripheral ends of the cutting edges on which a particularly high cutting load is exerted can be prevented from chipping.

In addition, if the inner peripheral ends of the cutting edges are spaced from the axis toward the outer periphery of the tool in the vicinity of the center of rotation of the tool, the cutting edges do not exist at the center of rotation of the tool on which the highest load is exerted, so that the load exerted during drilling can be further reduced, and the thickness of the core diameter portion of the distal end of the tool body can be ensured by the amount of spaces formed between the inner peripheral ends of the cutting edges to prevent the core diameter portion from being damaged.

Furthermore, according to the present invention, there is provided a tip including a tip body formed into a shape of a substantially triangular plate, one triangular surface of the tip body having a rake face formed thereon and one side surface of the tip body connected to the rake face serving as a flank face; and a cutting edge formed along a ridge between the rake face and the flank face, wherein an inclined surface proceeding toward the other triangular surface of the tip body as it is separated from the cutting edge is formed on the rake face, and wherein the ratio of the area of the one triangular surface to the area of the other triangular surface is at least 30%, as viewed in plan from the direction opposite to the one triangular surface.

Therefore, according to the thus-constructed tip, the inclined surface with which the chips produced by the cutting edge are brought into sliding contact occupies 30% or more of the one triangular surface on which the rake face is formed, so that the length of the chips flowing out along the inclined surface can be sufficiently ensured, whereby the outflow direction of the chips is not changed suddenly, and the chips receive resistance to be gradually curled while being brought into sliding contact with the inclined surface to flow out. Therefore, efficient chip treatment can be achieved even under a drilling condition such that slightly elongated chips are produced. On the other hand, large resistance due to a sudden change of the outflow direction of the chips is not exerted, and the axial rake angle of the cutting edge can be set nearer the positive angle, so that the cutting resistance exerted during drilling can be reduced.

Here, in the tip of the present invention, the ratio of the inclined surface to the one triangular surface on which the rake face is formed may be 30% or more, as described above, that is, the whole surface of the one triangular surface may be the inclined surface. However, in order to treat more securely the slightly elongated chips, it is preferable that a breaker wall surface having a shape of a concave surface and smoothly connected to the inclined surface to rise from the inclined surface is formed on the rake face on the opposite side of the cutting edge via the inclined surface, and that the chips abraded the inclined surface to be gradually curled are finally brought into sliding contact with the breaker wall surface to be curled.

In addition, in order to further reduce the cutting resistance exerted on the tool body during drilling, a plurality of recesses or projections may preferably be formed on the inclined surface to decrease the contact area between the chips and the inclined surface while ensuring the outflow length of the chips.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 24 is a side view, as viewed from the direction of the arrow A in FIG. 22.

FIG. 25 is a sectional view taken along C—C in FIG. 22.

FIG. 26 is a side view, as viewed from the direction of the arrow B in FIG. 22.

FIG. 28 is an enlarged plan view of a distal end portion of the drilling tool shown in FIG. 27.

FIG. 29 is an enlarged side view of the distal end portion of the drilling tool shown in FIG. 27.

FIG. 30 is an enlarged front view of the drilling tool shown in FIG. 27.

FIG. 31 is a plan view showing a second embodiment of a tip according to the present invention, as viewed from the direction opposite to one triangular surface 52 of a chip body 51.

DETAILED DESCRIPTION OF THE PREFERRED EMBODIMENTS

Figure 1:
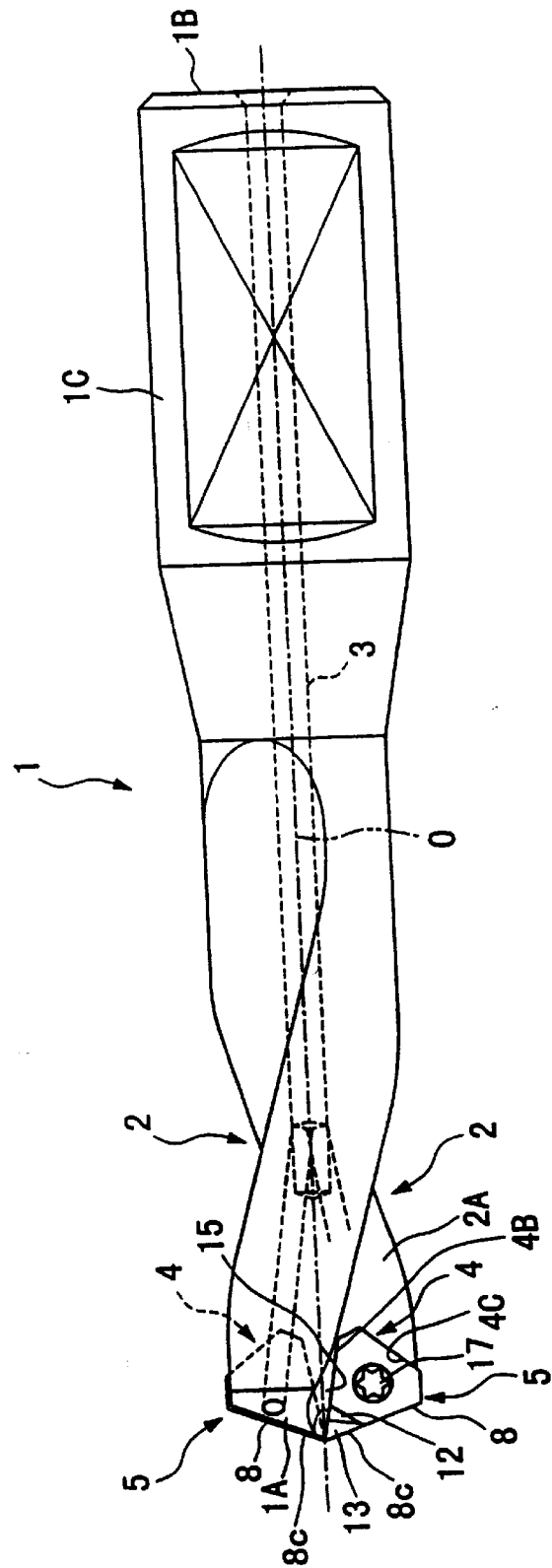
FIG. 1 is a plan view showing an embodiment of a drilling tool according to a first aspect of the present invention.

FIGS. 1 to 9 show an embodiment of a drilling tool according to a first aspect of the invention, in which the present invention is applied to a throw-away drilling tool. That is, in this embodiment, a tool body 1 is formed into a shape which is substantially columnar about its axis O, and a pair of chip discharge grooves 2 and 2, which are opened at a distal end face 1A of the tool body 1 and extending toward the rear end while twisting around the axis O rearward in a direction of rotation T of the tool, are formed in an outer periphery of the distal end of the tool body 1 in symmetrical relation about the axis O. In addition, in the tool body 1, a supply path 3 for a lubricating and cooling agent or the like is formed, which extends from a rear end face 1B toward the distal end along the axis O at a portion of a shank 1C, and is branched in the vicinity of the distal end to be opened in the distal end face 1A. Furthermore, tip-mounting seats 4 and 4 are formed at respective distal ends of wall surfaces 2A of the chip discharge grooves 2 and 2 facing in the direction of rotation T of the tool, and a tip 5 shown in FIGS. 6 to 9 is mounted to each of the tip-mounting seats 4 and 4.

The tip 5 is made of a hard material, such as a cemented carbide alloy, in the form of a substantially triangular plate, more exactly, in the form of a partial pentagonal plate, a cutting edge 8 is formed along a crossing ridge between one pentagonal surface 6 and one side surface 7 of the tip 5, and a mounting hole 9 for mounting the tip 5 on the tip-mounting seat 4 is formed in the center of the pentagonal surface 6 so as to penetrate the tip 5 in the direction of the thickness thereof. The tip 5 of this embodiment is a positive tip in which the pentagonal surface 6 and the side surface 7 cross each other at an acute angle through the cutting edge 8, and the cutting edge 8 is treated for honing.

Figure 6:
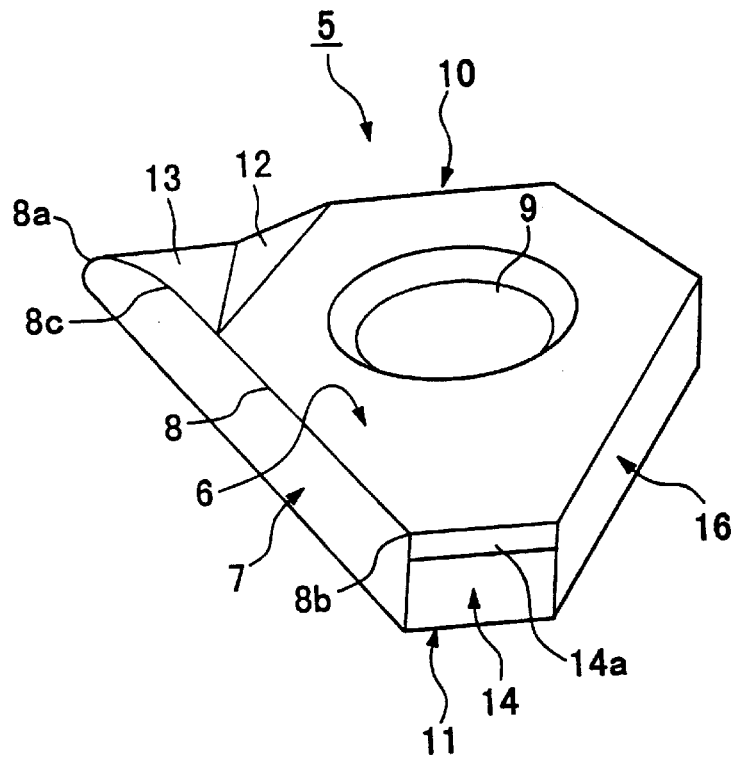
FIG. 6 is a perspective view of the tip 5 attached to the drilling tool shown in FIG. 1.
Figure 7:
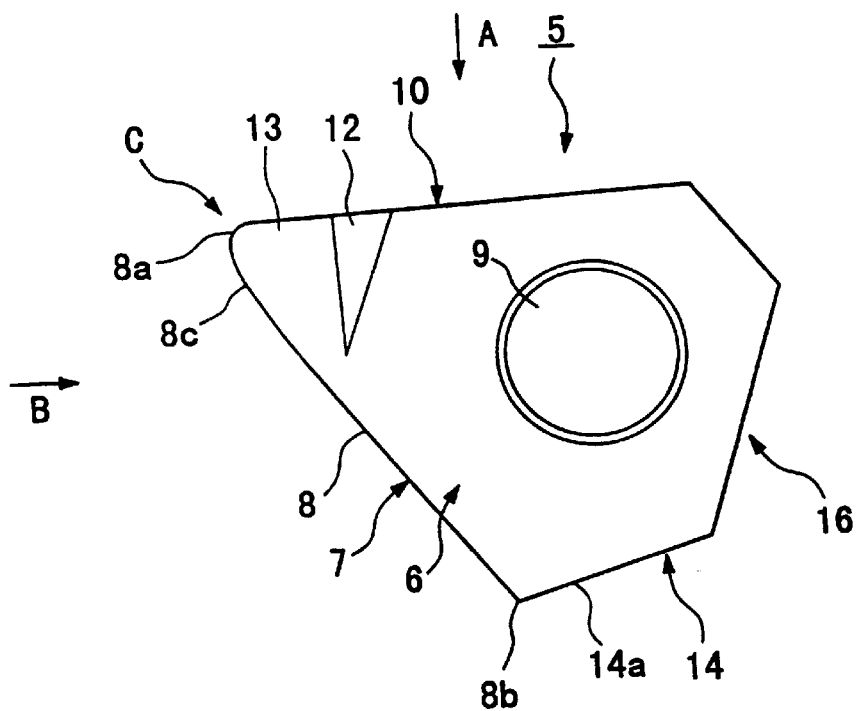
FIG. 7 is a plan view of the tip 5 shown in FIG. 6.
Figure 8:
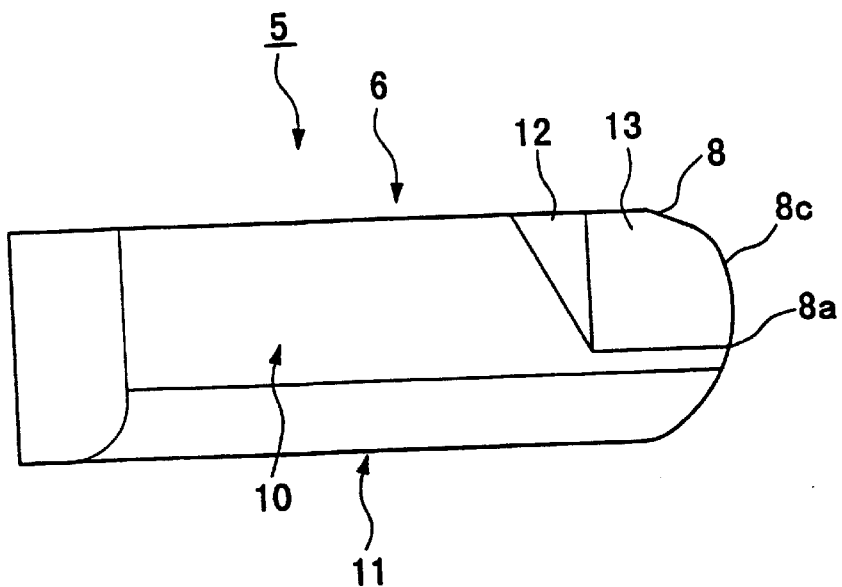
FIG. 8 is a side view, as viewed from the direction of the arrow A in FIG. 7.
Figure 9:
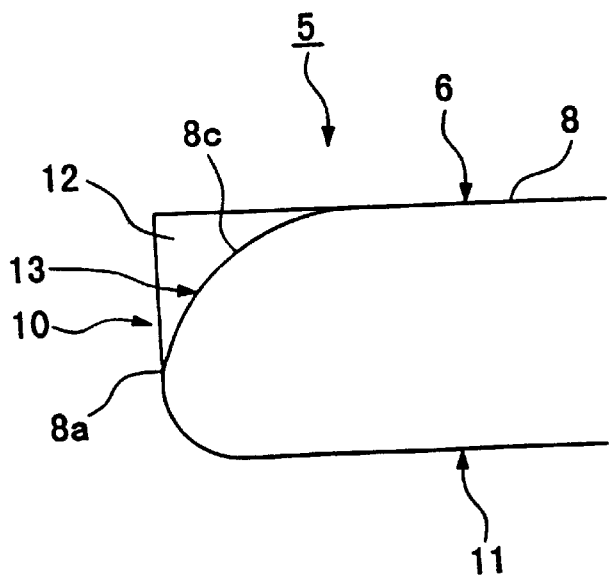
FIG. 9 is a side view, as viewed from the direction of the arrow B of FIG. 7.
Figure 10:
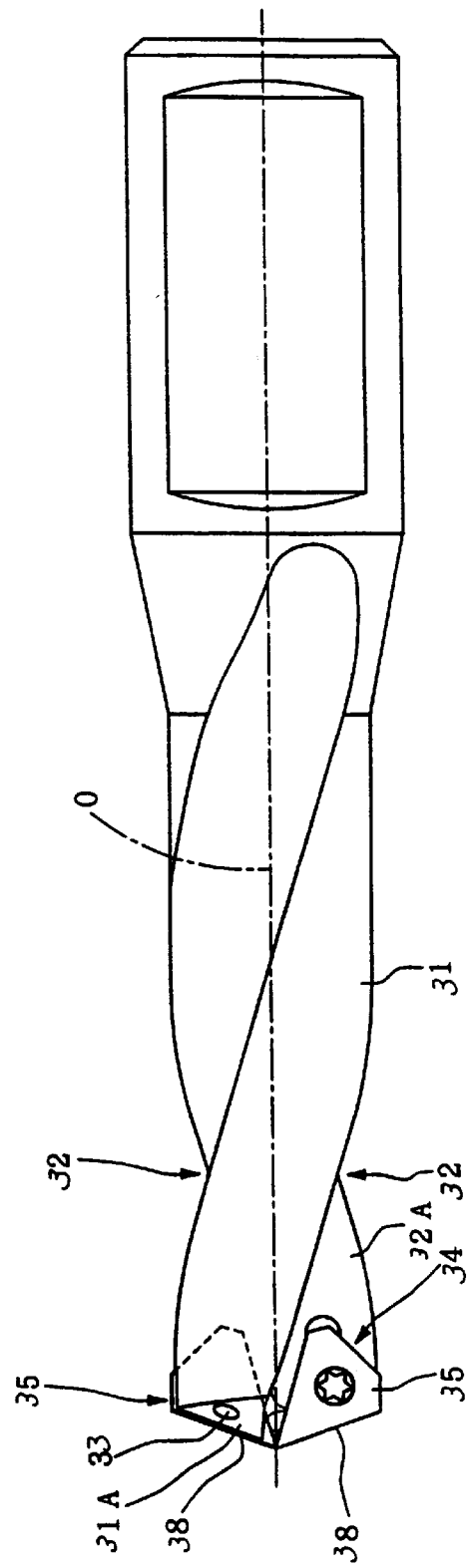
FIG. 10 is a plan view showing an embodiment of a drilling tool according to a second aspect of the present invention.
Figure 11:
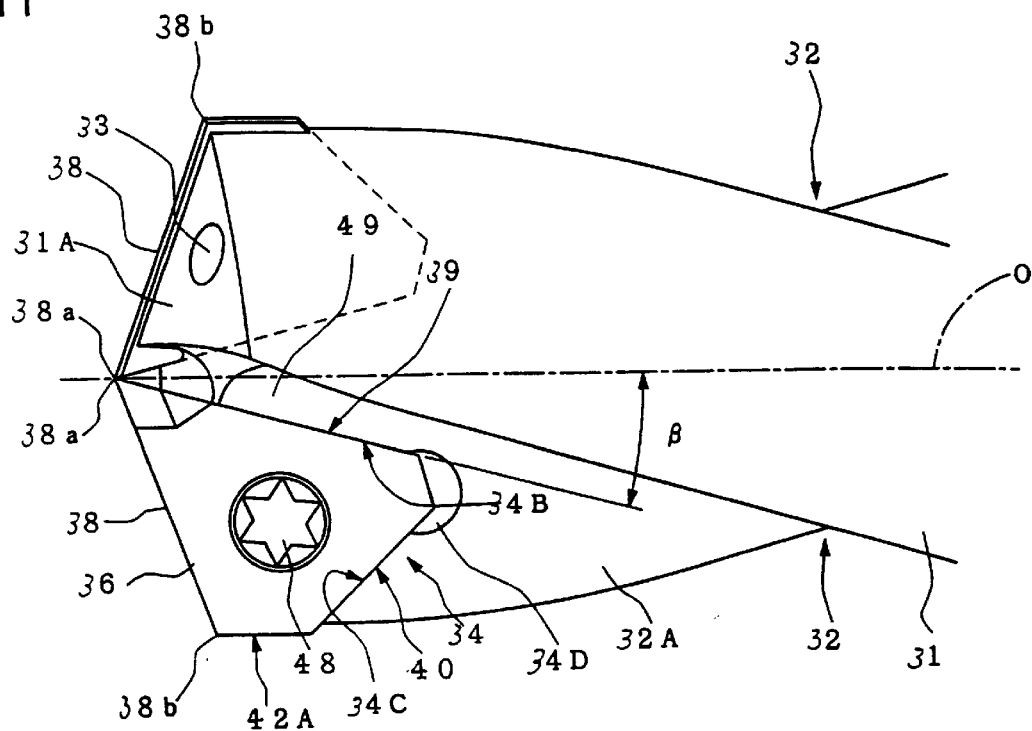
FIG. 11 is an enlarged plan view of a tool body 31 of the drilling tool shown in FIG. 10.
Figure 12:
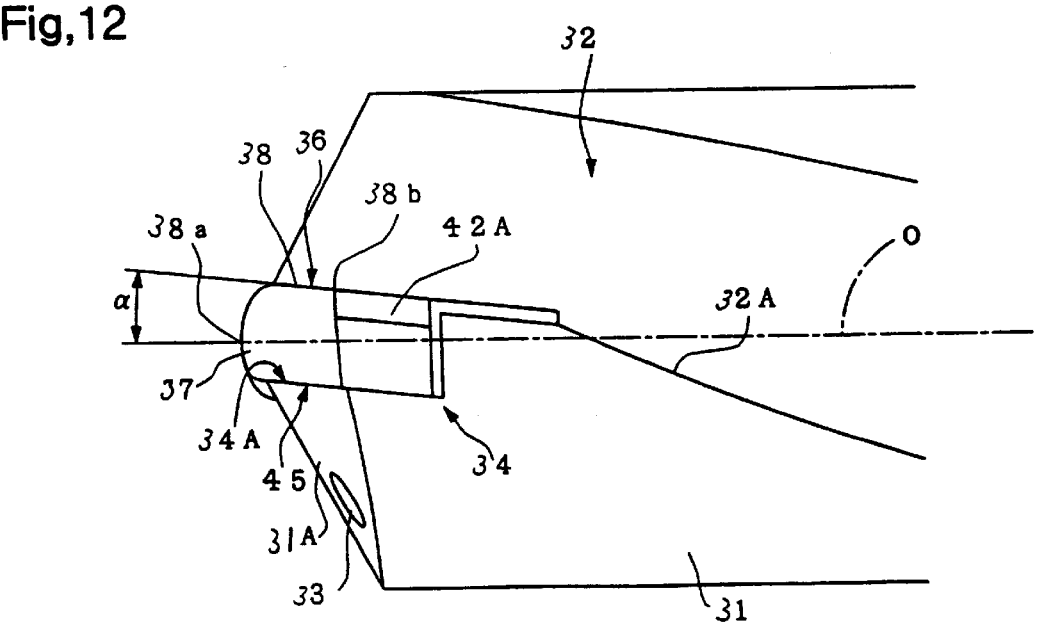
FIG. 12 is an enlarged side view of the tool body 31 of the drilling tool shown in FIG. 10.
Figure 13:
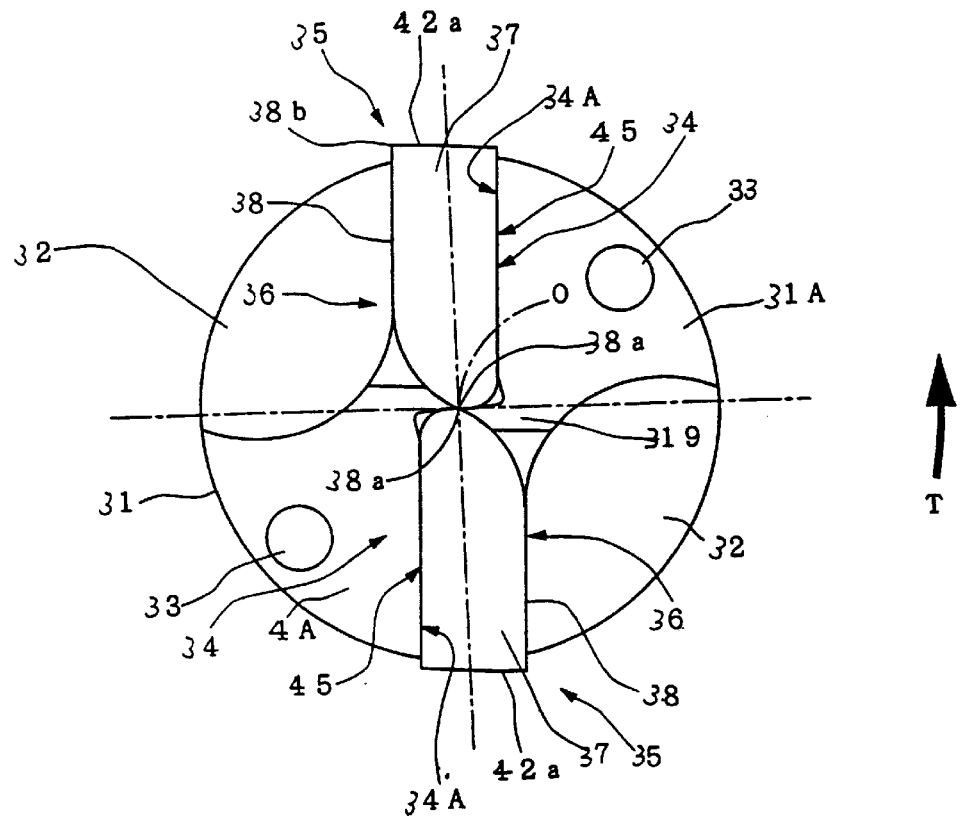
FIG. 13 is an enlarged front view of the drilling tool shown in FIG. 10, as viewed from the distal end thereof.

Furthermore, in the tip 5, as shown in FIGS. 6 and 7, on the pentagonal surface 6 of a corner C at which the above side surface 7 and a side surface 10 crossing the side surface 7 at an acute angle cross each other, there are formed, in the order, toward the pointed end of the corner C, an inclined plane 12 which is inclined at a constant gradient toward the other pentagonal surface 11 as it proceeds toward the pointed end, and a cylindrical surface 13 which is connected to the inclined plane 12 to proceed toward the other pentagonal surface 11 while forming a convex curve as it proceeds toward the above side surface 10. The cylindrical surface 13 formed at the corner C crosses the side surface 7 to form a part of the cutting edge 8 adjacent to one end 8a (adjacent to the side surface 10), whereby a portion of the one end 8a of the cutting blade 8 is formed to curve in the shape of a convex curve toward the other pentagonal surface 11 as it proceeds toward the one end 8a. In addition, a side surface 14 crossing the above side surface 7 on the side of the other end 8b of the cutting edge 8 of the tip 5 is formed in the direction to come close to the side surface 10 at an acute angle as it is separated from the cutting edge 8, as viewed from the plane opposing the pentagonal surface 6, and a cylindrical surface 14a having a radius of curvature equal to the radius of a hole drilled by the drilling tool is formed on the side surface 14 adjacent to the above pentagonal surface 6 in such a manner as to form a convex curve from the above one pentagonal surface 6 toward the other pentagonal surface 11.

Figure 4:
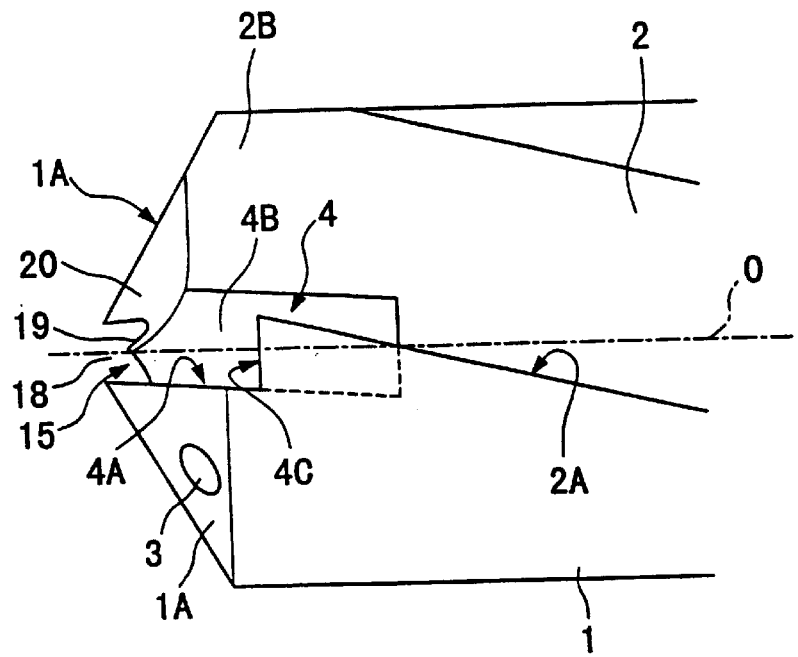
FIG. 4 is an enlarged side view of a tool body 1 to which a chip 5 of the embodiment shown in FIG. 1 is not attached.
Figure 5:
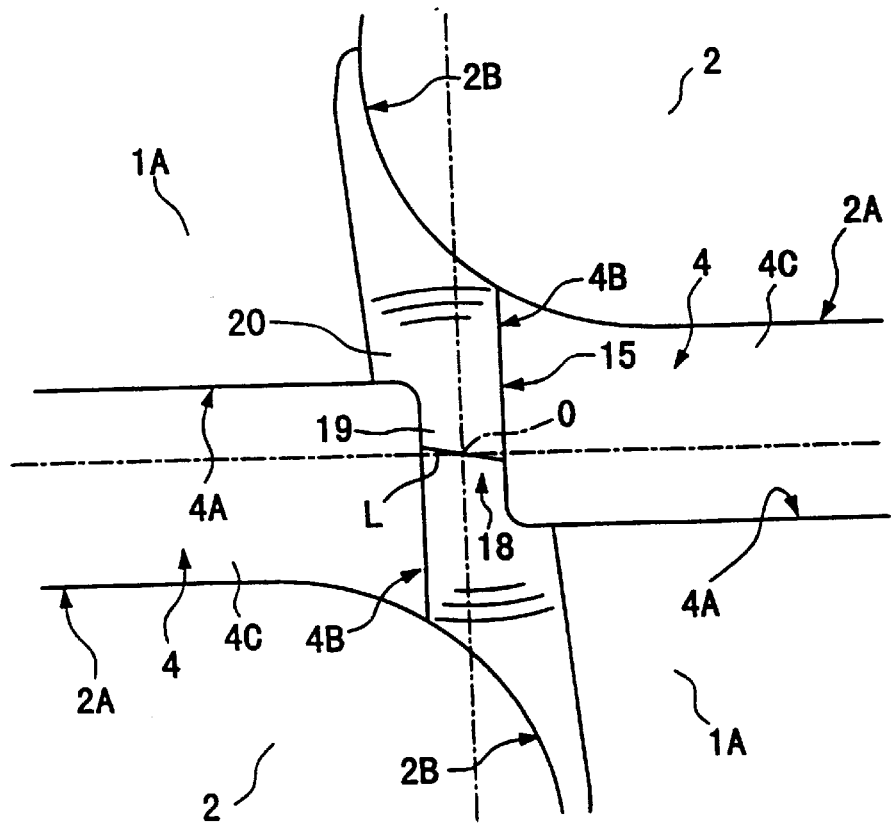
FIG. 5 is an enlarged view of the tool body 1 in the vicinity of the center of the distal end thereof to which the tip 5 of the embodiment shown in FIG. 1 is not attached.

On the other hand, the tip-mounting seat 4 on which the tip 5 is mounted is, as shown in FIGS. 4 and 5, defined by a bottom surface 4A formed in such a manner as to be recessed by one step from the wall surface 2A of the chip discharge groove 2 facing the direction of rotation T of the tool, and wall surfaces 4B and 4C rising from the bottom surface 4A to face the outer periphery and the distal end of the tool, respectively. A tapped hole (not shown) is formed in the bottom surface 4A, the wall surface 4B is formed in such a manner as to extend toward the outer periphery of the tool as it proceeds toward the rear end of the tool, and the wall surface 4C is formed in such a manner as to proceed toward the distal end of the tool as it proceeds toward the outer periphery of the tool. Here, the wall surfaces 4A and 4B are formed in positions separated from each other toward the outer periphery of the tool at equal distances from the central axis O of the tool body 1 in such a manner as to sandwich the axis O. The wall surface 4B is formed in such a manner as to proceed toward the outer periphery of the tool as it proceeds toward the rear end of the tool as described above, whereby a wall 15 having a thickness gradually increasing toward the rear end of the tool is formed between both wall surfaces 4A and 4B in such a manner as to extend between both chip discharge grooves 2 and 2 along the axis O.

The tip 5 is seated on the thus-formed tip-mounting seat 4 such that the above one pentagonal surface 6 is located as a rake face to face in the direction of rotation T of the tool, the side surface 7 is located as an end flank face to face the distal end of the tool, the side surface 14 is located to face the outer periphery of the tool, the other pentagonal surface 11 is held in close contact with the bottom surface 4A of the tip-mounting seat 4, the side surface 10 is brought into abutment with the wall surface 4B, and the side surface 16 located on the opposite side of the side surface 7 via the side surface 14 is brought into abutment with the wall surface 4C. Furthermore, a clamp screw 17 inserted into the above mounting hole 9 is screwed into the tapped hole formed in the bottom surface 4A, whereby the tip 5 is fixed to the tool body 1. However, the tips 5 and 5 mounted on both the tip-mounting seats 4 and 4 are the same in size and shape, and are mounted in symmetrical relation about the axis O.

Figure 2:
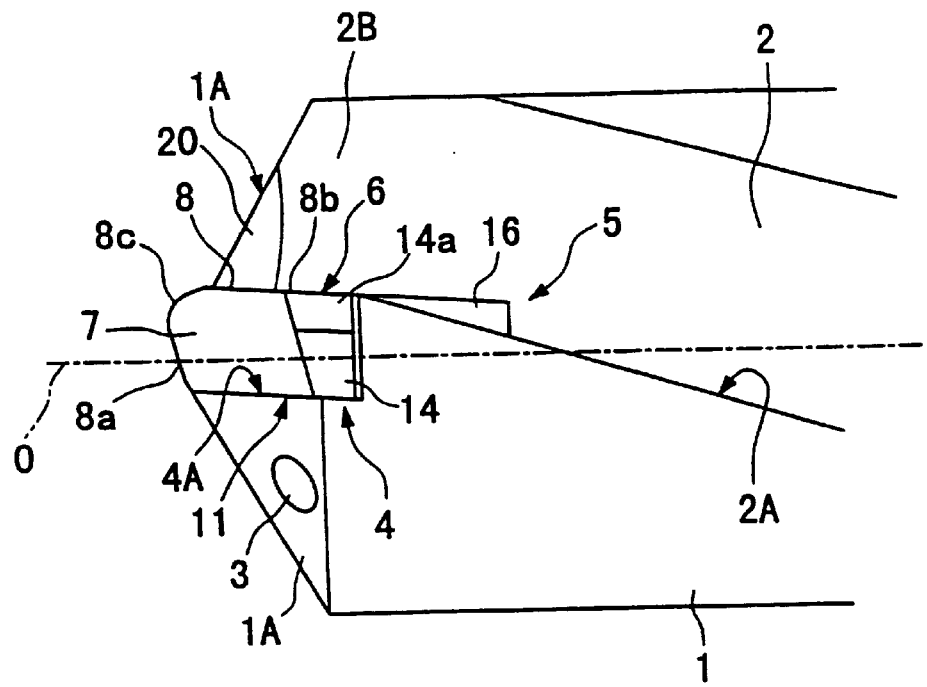
FIG. 2 is an enlarged side view of a distal end portion of the drilling tool shown in FIG. 1.
Figure 3:
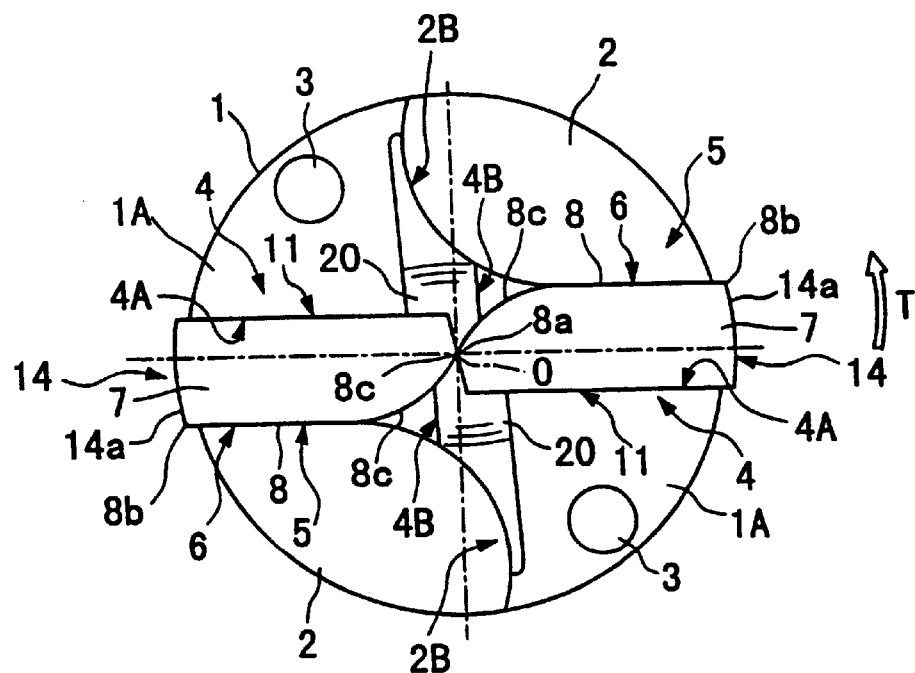
FIG. 3 is an enlarged front view of the drilling tool shown in FIG. 1, as viewed from the distal end of the tool.

In the thus-mounted tips 5 and 5, the cutting edges 8 and 8 formed along the crossing ridge between the pentagonal surfaces 6 and 6 as the rake surfaces and the side surfaces 7 and 7 as the end flank surfaces are disposed such that each one end 8a thereof is located adjacent to the distal end and the inner periphery of the tool, and is inclined toward the rear end of the tool as it proceeds from the one end 8a to the other end 8b, and each end 8a, to be inner peripheral end of the cutting blades 8 and 8 of the tips 5 and 5, is allowed to coincide with the axis O or disposed in positions slightly separated from the axis O toward the outer periphery, as shown in FIGS. 1 and 2. In addition, the cylindrical surface 14a of the side surface 14 of the tip 5 facing the outer periphery of the tool in this mounting state is disposed in such a manner that it slightly projects from the outer peripheral surface of the tool body 1 with the center at the axis O to form a margin of the drilling tool. Furthermore, a portion of the cutting edge 8 adjacent to the one end 8a curved in the shape of a convex curve will constitute an end 8c of the cutting blade 8 adjacent to the inner periphery of the tool, and the cylindrical surface 13 and the inclined plane 12 constitute a rake face connected to the end 8c of the cutting blade 8 adjacent to the inner periphery of the tool.

On the other hand, in the wall 15 formed between the wall surfaces 4B and 4B of the tip-mounting seats 4 and 4, there is formed an end face facing the distal end of the tool at a position retracted from the distal end face 1A of the tool body 1 toward the rear end of the tool, as shown in FIG. 4. Therefore, at a portion where the wall 15 is retracted with the tips 5 and 5 mounted on the tip-mounting seats 4 and 4, a recess 18 recessed toward the rear end of the tool along the axis O to communicate with the chip discharge grooves 2 and 2 is defined between portions of the side surfaces 10 and 10 of the tips 5 and 5 adjacent to the distal end of the tool, and the end face of the wall 15 facing the distal end of the tool serves as a bottom surface 19 of the recess 18. In this embodiment, concave surfaces 20 and 20 are formed along crossing ridges between the distal end face 1A of the tool body 1 and the wall surfaces 2B and 2B of the chip discharge grooves 2 and 2 facing rearward in the direction of rotation T of the tool, and the concave surfaces 20 and 20 extend toward the inner periphery of the tool so as to be connected to the bottom surface 19 of the recess 18, and cross each other via a crossing ridge L crossing the axis O.

Here, in this embodiment, these concave surfaces 20 and 20 are formed in such a manner as to form spherical concave curves at the portions thereof adjacent to the inner periphery of the tool, and are formed such that they rise in the direction of rotation T of the tool with respect to the cylindrical surface 13 and the inclined plane 12 serving as rake faces connected to the end 8c of the cutting edge 8 adjacent to the inner periphery of the tool, they proceed toward the distal end of the tool while forming concave curves as they proceed from the wall surface 4B of the tip-mounting seat 4 toward the direction of rotation T of the tool, they also proceed toward the distal end of the tool from the outer periphery of the tool to the inner periphery of the tool, as shown in FIG. 4, while forming concave curves to reach the crossing ridge L. In addition, the concave surface 20 is formed such that it is flush with or substantially flush with the cylindrical surface 13 and the inclined plane 12, or it is recessed by one step with respect to the cylindrical surface 13 and the inclined surface 12, or it is connected to the cylindrical surface 13 and the inclined surface 12 via a step portion projecting one step in an amount of projection of 1 mm or less, and it forms a concave curve to rise with respect to the cylindrical surface 13 and the inclined plane 12 after being connected to the cylindrical surface 13 and the inclined plane 12 adjacent to the inner periphery of the tool.

In the thus-constructed drilling tool, chips produced by the cutting edge 8, particularly by the end 8c adjacent to the inner periphery of the tool, flow out toward the inner periphery of the tool in the shape of a fan about the one end 8a of the cutting edge 8, abrade the cylindrical surface 13 and the inclined plane 12 serving as rake faces connected to the end 8c of the cutting blade 8, and are crushed into and pressed to the concave surface 20 rising on the cylindrical surface 13 and the inclined plane 12 adjacent to the inner periphery. Here, the concave surface 20 is formed such that it proceeds toward the distal end of the tool while forming a concave curve as it proceeds in the direction of rotation T of the tool as described above, so that the chips pressed against the concave surface 20 are curved along the concave surface 20 in such a manner that they are pressed to the concave surface 20 and are curled into conical shapes toward the arc of the fan into which the flowing chips are shaped. Therefore, according to the drilling tool having the above construction, it is possible to securely curl and promptly discharge sheared-off chips formed in the vicinity of the center of the distal end of the tool body 1, thereby preventing the chips from becoming packed and interfering with a smooth chip treatment.

In addition, in this embodiment, the end face of the wall 15 defined between the wall surfaces 4B and 4B of the tip-mounting seats 4 and 4 retracts toward the rear end of the tool, whereby the recess 18 is formed in the center of the distal end of the tool body 1, and the concave surfaces 20 and 20 are formed in such a manner that they are connected to the bottom surface 19 of the recess 18 to proceed toward the distal end of the tool while forming concave curves from the outer periphery of the tool to the inner periphery of the tool so as to cross at their crossing ridges on the axis O. For this reason, even if the inner peripheral ends 8a and 8a of the cutting edges 8 and 8 are spaced from the axis O toward the outer periphery of the tool, and a core of the workpiece grows between the inner peripheral ends 8a and 8a along the axis during drilling, the core collides with the bottom surface 19 of the recess 18 to be guided toward one of the concave surfaces 20 and 20, is twisted around the axis O to be cut, and is then discharged to the chip discharge groove 2 connected to the other concave surface 20 from the concave surface 20. Therefore, according to this embodiment, even if the core grows during the drilling, the core can be securely discharged to the chip discharge groove 2, whereby it is possible to achieve a smoother chip treatment and to securely prevent the occurrence of chip packing, in cooperation with a fact that the chips produced in the vicinity of the center of the distal end of the tool body 1 are positively curled by the concave surface 20.

Incidentally, in this embodiment, the chips produced by the end 8c of the cutting edge 8 adjacent to the inner periphery of the tool abrade the cylindrical surface 13 and the inclined plane 12, each serving as a rake face connected to the end 8c, to flow toward the inner periphery of the tool, and then, collide with the concave surface 20 connected to the cylindrical surface 13 and the inclined plane 12 in the direction of rotation T of the tool so that the chips are curled. In this case, if the concave surface 20 projects by a large amount with respect to the cylindrical surface 13 and the inclined plane 12 to form a large step portion, the chips flowing from the cylindrical surface 13 and the inclined plane 12 may collide with the step portion and become packing. For this reason, the concave surface 20 may preferably be formed so that it is flush with the cylindrical surface 13 and the inclined plane 12, each serving as a rake face connected to the end 8c of the cutting edge 8 adjacent to the inner periphery of the tool, toward the inner periphery of the tool, or it retracts one step, or it is connected to the cylindrical surface 13 and the inclined plane 12 via a step portion projecting by one step in an amount of projection of 1 mm or less, that is, the concave surface 20 may preferably be disposed in such a manner that it does not project more than 1 mm with respect to the cylindrical surface 13 and the inclined plane 12.

While the concave surface 20 is formed so as to draw a spherical concave curve in this embodiment, it may be formed in such a manner that a curvature of a concave surface facing the direction of rotation T of the tool and a concave surface facing the inner periphery of tool varies. In addition, when the first aspect of the invention is applied to a common twist drill or the like in which the core does not grow during drilling, the concave surface 20 may be formed into a concave cylindrical surface or a concave conical surface that does not form a concave curve toward the distal end of the tool. Furthermore, in this embodiment, application of the first aspect of the invention to a throw-away drilling tool in which the cutting edge 8 is formed on the tip 5 detachably attached to the tool body 1 has been described. However, it is also possible to apply the first aspect of the invention to a drilling tool other than the throw-away drilling tool, such as a drilling tool to which a cutting tip is brazed or a drilling tool having a cutting edge directly formed on a tool body.

Next, FIGS. 10 to 18 show a first embodiment of a drilling tool according to a second aspect of the invention. In this embodiment, a tool body 31 is formed into a shape which is substantially columnar shape about its axis O, and a pair of chip discharge grooves 32 and 32, which are opened at a distal end face 31A of the tool body 31 and extending toward the rear end while twisting around the axis O rearward in a direction of rotation T of the tool, are formed in an outer periphery of the distal end of the tool body 31 in symmetrical relation about the axis O. In addition, in the tool body 31, a supply path 33 for a lubricating and cooling agent or the like is formed, which extends from a rear end face toward the distal end along the axis O at a portion of a shank, and is branched in the vicinity of the distal end to be opened at the distal end face 31A. Furthermore, tip-mounting seats 34 and 34 are formed at respective distal ends of wall surfaces 32A of the chip discharge grooves 32 and 32 facing in the direction of rotation T of the tool, and a tip 35 shown in FIGS. 15 to 18 is mounted on each of the tip-mounting seats 34 and 34.

Figure 16:
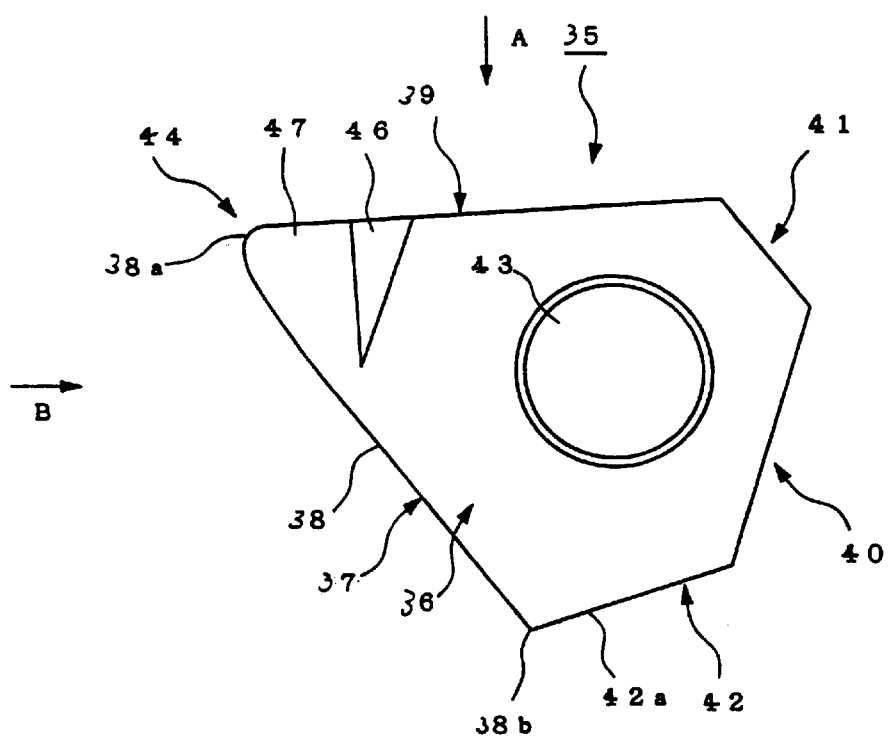
FIG. 16 is a plan view of the tip 35 shown in FIG. 15.
Figure 17:
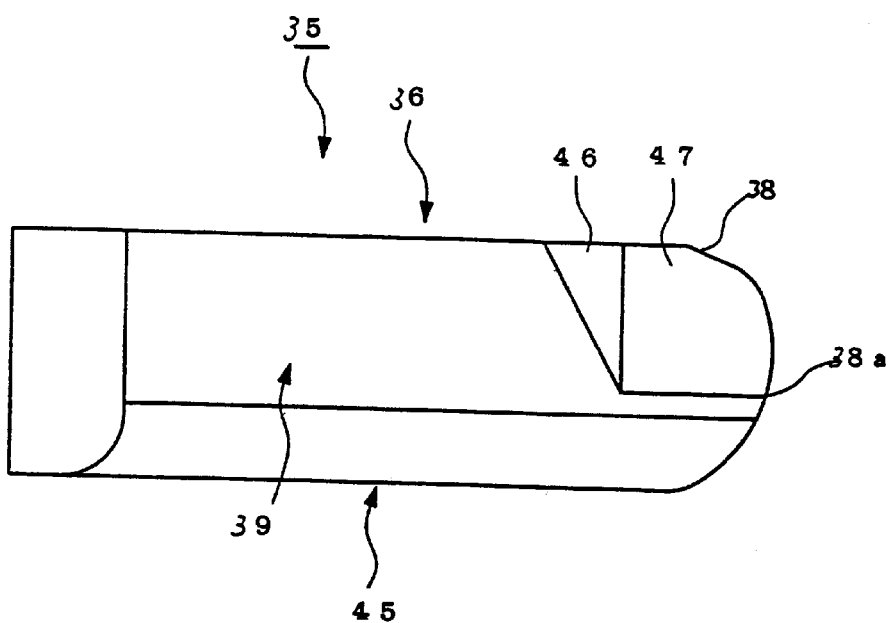
FIG. 17 is a side view, as viewed from the direction of the arrow A in FIG. 16.
Figure 18:
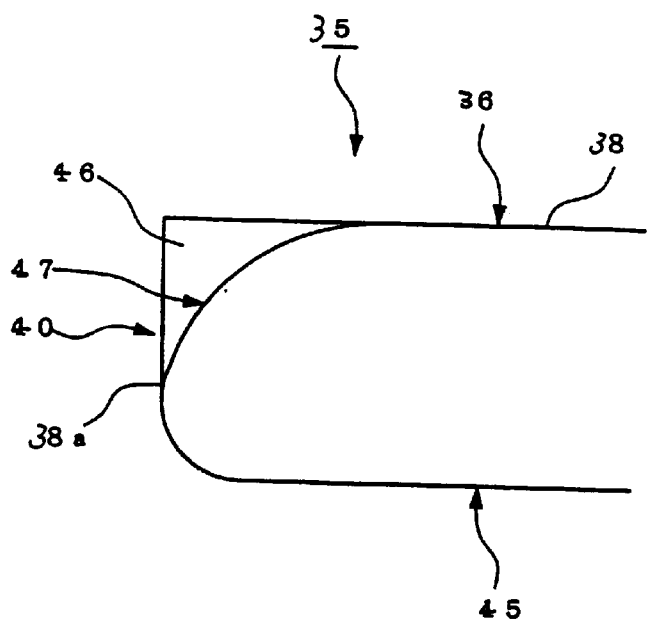
FIG. 18 is a side view, as viewed from the direction of the arrow B in FIG. 16.

The tip 35 is substantially the same as the tip 5 shown in FIGS. 6 to 9, i.e., the tip 35 is made of a hard material, such as a cemented carbide alloy, in the form of a substantially triangular plate. One triangular surface 36 serves as a rake face and one side surface 37 serves as an end flank face, and a cutting edge 38 is formed along a crossing ridge between the triangular surface 36 and the side surface 37. However, a corner 41 at which two side surfaces 39 and 40 other than the side surface 37 serving as the end flank face of the tip 35 cross each other, and a corner 42 at which the side surface 40 and the side surface 37 cross each other are cut away in such a manner as to cross the side surfaces 39 and 40, and the side surfaces 37 and 40, respectively, at an obtuse angle, as viewed from the direction opposite to the triangular surface 36, whereby the tip 35 exhibits strictly a shape of a partial pentagonal plane, as shown in FIG. 16 similarly to the tip 5. The tip 35 of this embodiment is a positive tip in which the triangular surface 36 and the side surface 37 cross each other at an obtuse angle through the cutting edge 38, and the cutting edge 8 is treated for honing. In addition, a mounting hole 43 for mounting the tip 35 on the tip-mounting seat 34 is formed in the center of the triangular surface 36.

Furthermore, in the tip 35, the side surface 39 and the side surface 37 serving as an end flank face are disposed so as to cross at a corner 44 at an acute angle, as viewed from the direction opposite to the triangular surface 36, and at the portion of the triangular surface 36 adjacent to the corner 44, there are formed, in the order toward the pointed end of the corner 44, an inclined plane 46 which is inclined at a constant gradient toward the other triangular surface 45 of the tip 35 as it proceeds toward the pointed end, and a cylindrical surface 47 which is connected to the inclined surface 46 to proceed toward the other triangular surface 45 while drawing a convex curve as it proceeds toward the side surface 39. Therefore, the cylindrical surface 47 formed on the triangular surface 36 serving as a rake face crosses the side surface 37 serving as an end flank face to form a portion of the cutting edge 38 adjacent to one end 38a, whereby the portion of the cutting edge 38 adjacent to one end 38a is formed to curve in the shape of a convex curve toward the other triangular surface 45 as it proceeds toward the one end 38a.

On the other hand, the corner 42 at which the side surface 37 crosses the side surface 40 on the cutting edge 38 adjacent to the other end 38b is formed in a direction to come close to the side surface 39 at an acute angle as it proceeds toward the one end 38a, as viewed from the direction opposite to the triangular surface 36. Furthermore, a cylindrical surface 42a having a radius of curvature equal to the radius of a hole drilled by the drilling tool is formed on the corner 42 adjacent to the triangular surface 36 in such a manner as to form a convex curve from the one triangular surface 36 toward the other triangular surface 45. Incidentally, in the tip 35 of this embodiment, these triangular surfaces 36 and 45 are formed in such a manner that the other triangular surface 45 is in parallel with flat portions of the one triangular surface 36 other than the inclined plane 46 and the cylindrical surface 47.

The tip-mounting seat 34 on which the tip 35 is mounted is defined by a bottom surface 34A formed in such a manner as to be recessed one step from the wall surface 32A of the chip discharge groove 32 facing in the direction of rotation T of the tool, and wall surfaces 34B and 34C rising from the bottom surface 34A to face the outer periphery of the tool and the distal end of the tool, respectively, and a tapped hole (not shown) is formed in the bottom surface 34A. The bottom surface 34A of the tip-mounting seat 34 is formed so as to be inclined rearward in the direction of rotation T of the tool as it proceeds toward the rear end of the tool so that the triangular surface 36 serving as a rake face forms a positive axial rake angle α of 7° to 15° with respect to the axis O of the tool body 31 when the tip 35 is mounted as described hereinbelow, and the wall surface 34B of the tip-mounting seat 34 facing the outer periphery of the tool is formed in such a manner as to proceed toward the outer periphery of the tool as it proceeds toward the rear end of the tool while forming an angle of inclination β of 10° to 20° with respect to the axis O, as viewed from the direction opposite to the bottom surface 34A. Furthermore, the wall surface 34C of the tip-mounting seat 34 facing the distal end of the tool is formed in such a manner as to proceed toward the distal end of the tool as it proceeds toward the outer periphery of the tool. Incidentally, on a corner where these wall surfaces 34B and 34C cross each other, there is formed a relief 34D for preventing the interference with the corner 41 of the tip 35.

The tip 35 is seated on the thus-formed tip-mounting seat 34 such that the one triangular surface 36 is located as a rake face to face in the direction of the rotation T of the tool, the side surface 37 is located as an end flank face to face the distal end of the tool, the corner 42 is located to face the outer periphery of the tool to hold the other triangular surface 45 into close contact with the bottom surface 34A of the tip-mounting seat 34, the side surface 39 is located to face the inner periphery of the tool so as to be brought into abutment with the wall surface 34B, and the side surface 41 is brought into abutment with the wall surface 34C. Then, a clamp screw 48 inserted into the mounting hole 43 is screwed into the tapped hole formed in the bottom surface 34A, whereby the tip 35 is fixed to the tool body 31. However, the tips 35 and 35 mounted to both tip-mounting seats 34 and 34 are the same in size and shape, and are mounted in symmetrical relation about the axis O.

Figure 14:
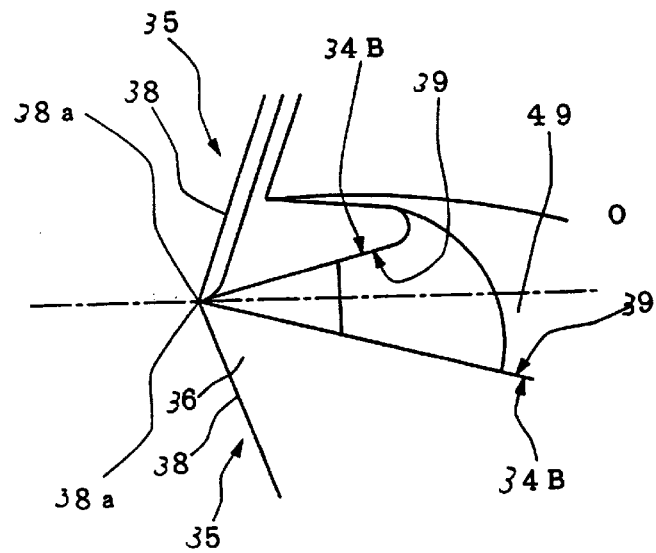
FIG. 14 is an enlarged plan view of the drilling tool shown in FIG. 10 in the vicinity of the center of rotation thereof.
Figure 15:
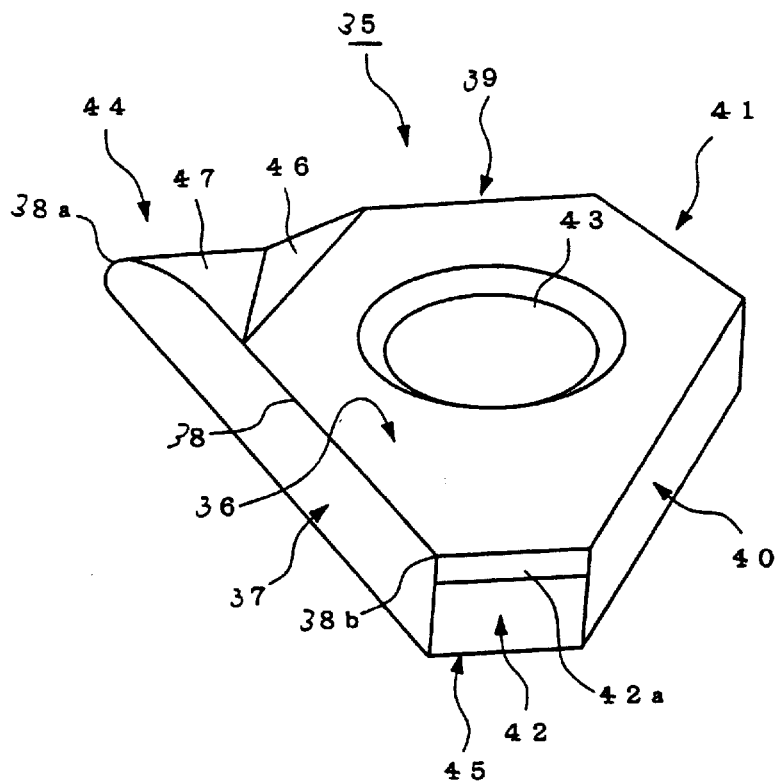
FIG. 15 is a perspective view of a tip 35 attached to the drilling tool shown in FIG. 10.

In this embodiment, the cutting edges 38 and 38 of the thus-mounted tips 35 and 35 are disposed such that each one end 38a thereof is butted so as to coincide with the center of rotation of the tool located at the distal end of the tool body 31, as shown in FIG. 14, and to be inclined toward the rear end of the tool as they proceed from the one end 38a to the other end 38b. In addition, the cylindrical surface 42a of the corner 42 of the tip 35 facing the outer periphery of the tool in this mounting state is disposed in such a manner as to slightly project from the outer peripheral surface of the tool body 31 with the center at the axis O to form a margin of the drilling tool.

Then, the bottom surface 34A of the tip-mounting seat 34 is inclined as described above, whereby the triangular surfaces 36 and 36 located as rake faces to face in the direction of rotation T of the tips 35 and 35 are inclined in such a manner as to proceed rearward in the direction of rotation of the tool as they proceed toward the rear end of the tool while forming a positive axial rake angle $\alpha$ of 7° to 15° with respect to the axis O. In addition, between the wall surfaces 34B and 34B of the tip-mounting seats 34 and 34 facing the outer periphery of the tool with which the side surfaces 39 and 39 of the tips 35 and 35 located to face the inner periphery of the tool are brought into abutment, the wall surfaces 34B and 34B are inclined toward the outer periphery of the tool while forming an angle of inclination $\beta$ of 10° to 2° with respect to the axis O toward the outer periphery of the tool as they proceed toward the rear end of the tool, whereby a wall 49 is formed along the axis O whose thickness gradually increases toward the rear end of the tool. However, the distal end face of the wall 49 is formed at a position retracted toward the rear end of the tool with respect to the distal end surface 31A of the tool body 31, as shown in FIG. 14, and therefore, at a portion where the wall 49 retracted with the tips 35 and 35 mounted on the tip-mounting seats 34 and 34, a recess recessed toward the rear end of the tool along the axis O to communicate with the chip discharge grooves 32 and 32 is defined between portions of the side surfaces 39 and 39 of the tips 35 and 35 adjacent to the distal end of the tool.

Therefore, in the thus-constructed drilling tool, the positive axial rake angle $\alpha$ of 7° to 15° is given to the triangular surface 36 serving as a rake face of the tip 35, so that the cutting quality of the cutting edge 38 is improved and the cutting resistance during drilling is decreased, whereby rotational driving force for rotating the tool body 31 is decreased and at the same time, occurrence of chatter or vibration in the tool body 31 is prevented, and the precision of a drilled hole, such as an enlarged margin of the drilled hole, can be increased. On the other hand, although the tip 35 is inclined in order to give the positive axial rake angle $\alpha$ as described above, in the drilling tool constructed as described above, the wall surface 34B of the tip-mounting seat 34 facing the outer periphery of the tool is inclined toward the outer periphery of the tool at an angle of inclination $\beta$ of 10° to 20° as it proceeds toward the rear end of the tool, and the wall 49 formed between the wall surfaces 34B and 34B of a pair of tip-mounting seats 34 and 34 along the axis O of the tool body 31 is also formed in such a manner that the thickness thereof gradually increases toward the rear end of the tool as described above, so that the strength of a core diameter portion of the distal end of the tool body 31 can be avoided from being impaired, whereby the portion can be prevented from being damaged, and a tool life can be extended.

Here, according to the drilling tool constructed as described above, the axial rake angle $\alpha$ given to the triangular surface 36 serving as the rake face of the tip 35 is set to 7° to 15°. This is because, when the axial rake angle $\alpha$ is small to such an extent as to fall short of 7°, the effect of decreasing the cutting resistance is not sufficient even if the axial rake angle $\alpha$ is a positive angle and therefore, the decrease of the rotational driving force of the tool body 31 and the improvement of the precision of a drilled hole may not be achieved sufficiently. On the other hand, when the axial rake angle $\alpha$ is large to such an extent as to exceed 15°, although the wall surface 34B of the tip-mounting seat 34 is inclined toward the outer periphery of the tool as it proceeds toward the rear end of the tool, a sufficient thickness of the wall surface 34B, particularly, adjacent to the distal end of the wall 49, may not be ensured and at the same time, according to the size, etc. of the tool body 31, the thickness between the bottom surface 34A of the tip-mounting seat 34 adjacent to the rear end of the tool and the outer peripheral surface of the tool body 31 is reduced, whereby the tool may be damaged from the portion.

In addition, according to the above drilling tool, the angle of inclination $\beta$ of the wall surface 34B of the tip-mounting seat 34 facing the outer periphery of the tool is set to 10° to 20°. This is because, when the angle of inclination $\beta$ is small to such an extent to fall short of 10°, the thickness between the walls 34B and 34B of a pair of tip-mounting seats 34 and 34 is not sufficiently ensured, and the damage at the wall 49 may not be securely prevented. On the other hand, when the angle of inclination $\beta$ is large to such an extent to exceed 20°, the width of the wall surface 34C with which the side surface 40 of the tip 35 is brought into abutment is reduced and the tip 35 is instably mounted, so that the precision of the drilled hole may be deteriorated.

Figure 19:
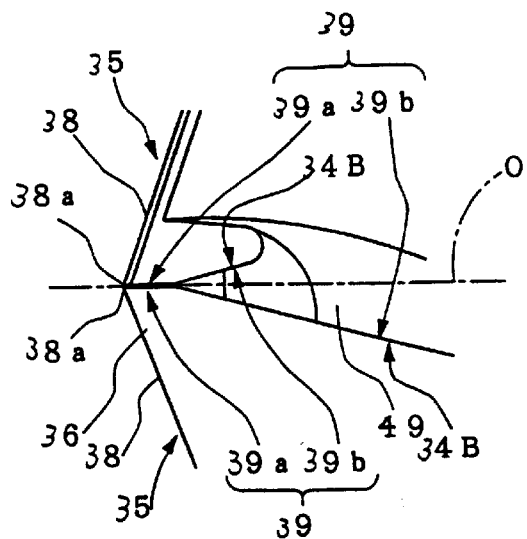
FIG. 19 is an enlarged plan view showing a modification of the drilling tool shown in FIG. 10 in the vicinity of the center of rotation thereof.

Incidentally, in the drilling tool of this embodiment, the side surface 37 serving as an end flank face of the tip 35 and the side surface 39 abutting against the wall surface 34B of the tip-mounting seat 34 are formed so as to cross each other at the corner 44 at an acute angle, and the side surfaces 39 and 39 are disposed in such a manner that they are gradually separated as they proceed from the corner 44 toward the rear end of the tool, as viewed from the direction opposite to the triangular surface 36 serving as the rake face, as shown in FIG. 14 with one ends 38a and 38a formed at the corner 44 to be inner peripheral ends of the cutting edges 38 and 38 of the pair of tips 35 and 35 being butted at the center of rotation of the tool. However, the side surfaces 39 and 39 of the pair of tips 35 and 35 may be gradually separated after extending toward the rear end of the tool along the axis O as viewed from the above opposite direction by forming portions of the side surfaces 39 each facing the inner periphery of the tool of the tip 35, as shown in FIG. 19, adjacent to the distal end of the tool by a plurality of side pieces 39a and 39b each bending at an obtuse angle as viewed from the direction opposite to the triangular surface 36 serving as the rake face. However, according to the thus-constructed drilling tool, the crossing angle between the side surfaces 37 and 39 at the corner 44 can be increased by the side pieces 39a adjacent to the distal end of the tool, so that a high strength can be imparted particularly to one end (inner peripheral end) 38a of the cutting edge 38 which is located in the vicinity of the center of the rotation of the tool, and on which a heavy load is exerted during drilling, whereby the tip 35 can be prevented from chipping and a smoother drilling can be achieved.

Figure 20:
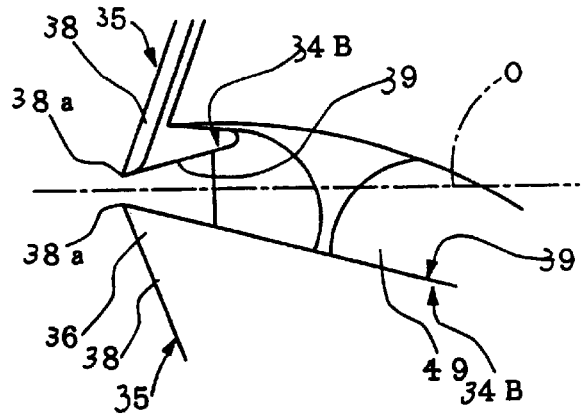
FIG. 20 is an enlarged plan view showing another modification of the drilling tool shown in FIG. 10 in the vicinity of the center of rotation thereof.
Figure 21:
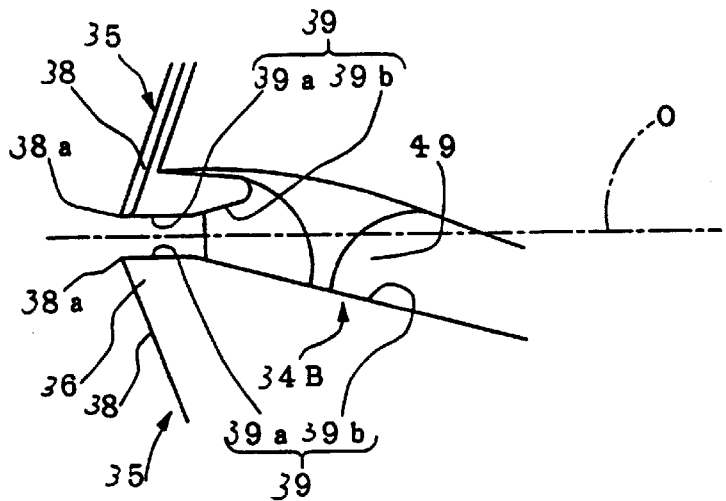
FIG. 21 is an enlarged plan view showing another modification of the drilling tool shown in FIG. 10 in the vicinity of the center of rotation thereof.

In addition, according to this embodiment, the pair of tips 35 and 35 are mounted with the one ends 38a and 38a, to be inner peripheral ends of the cutting edges 38 and 38 butted on the axis O of the distal end of the tool body 31, i.e., at the center of rotation of the tool, as shown in FIGS. 14 and 19. However, the tips 35 and 35 may be mounted, for example, as shown in FIGS. 20 and 21, in such a manner that the one ends 38a and 38a of the cutting edges 38 and 38 are slightly spaced in the vicinity of the center of rotation of the tool from the axis O toward the outer periphery of the tool. In this case, the cutting edges 38 and 38 do not exist at the center of rotation of the tool on which the highest load is exerted, so that the load during drilling can be substantially reduced, and the rotational driving force can be further decreased in cooperation with the fact that the positive axial rake angle α is given and at the same time, a sufficient thickness of the wall 49 can be ensured to prevent securely the damage thereof and further, chipping of the tip 35 at the corner 44 can be prevented more securely. When such a construction is adopted, a workpiece left along the axis O after cutting, so-called a core, will grow between the one ends 38a and 38a of the cutting edges 38 and 38. The core, however, is bent toward the outer periphery of the tool when reaching the end face of the wall 49 to be twisted off, and is then discharged from the chip discharge groove 32 together with chips produced by the cutting edge 38.

Next, advantageous effects of the second aspect of the invention will be proved by way of an example (experimental example). In this example, drilling is performed using three types of drilling tools in which the axial rake angle α was varied in the range of 7° to 15° and the angle of inclination β was varied in the range of 10° to 20° in the embodiments shown in FIGS. 10 to 18, and the number of drillable holes, the enlarged margin of the drilled hole, and cutting torque for rotationally driving the tool body 1 during drilling were measured. The results are shown in Table 1 as examples 1 to 3 together with the axial rake angle α and the angle of inclination β. However, the drilling was performed under the conditions that the workpiece was made of two sheets of plate materials put in layer, each consisting of SS 400 and having a thickness of 19 mm, the cutting speed was 80 m/min, and the feed speed was 0.3 mm/rev.

On the other hand, as comparative examples, seven types of drilling tools similar to those of the above examples except that the axial rake angle α was beyond the range of 7° to 15° and the angle of inclination β was beyond the range of 10° to 20° were prepared, and the drilling was performed under the same drilling conditions. The results are also shown in Table 1 as comparative examples 1 to 7.

Consequently, as shown in Table 1, it will be understood that according to the drilling tools of the examples 1 to 3, regarding the number of drillable holes, i.e., the tool life, regarding the enlarged margin of a drilled hole, i.e., the precision of the drilled hole and further, regarding the cutting torque, i.e., the cutting resistance during drilling, results better than those of the drilling tools of the comparative examples 1 to 7 were obtained. Incidentally, the number of drillable holes over 16000 in all examples 1 to 3 is a result of completion of drilling when 16000 holes were drilled because no significant deterioration of the tool life was observed even if 16000 holes were drilled.

In contrast, of the comparative examples 1 to 7, in the comparative examples 1 and 2 in which the axial rake angle α was reduced, the number of drillable holes was larger than that of the other comparative examples, however, chatter and vibration during drilling was great and increasing tendency of the enlarged margin was observed, and high cutting torque was required. In particular, according to the drilling tool of the comparative example 2 in which the axial rake angle α was a negative angle, the cutting torque for rotationally driving the tool body was large as compared with the other drilling tools, and a result was obtained such that the cutting torque heavily varies during drilling. Incidentally, the number of drillable holes over 500 in the comparative example 2 is a result of completion of drilling when 500 holes were drilled because the enlarged margin of the drilled hole was too large although the tool life presented no problem. In addition, according to the drilling tool of the comparative example 3 in which the axial rake angle α was enlarged toward the positive angle, the enlarged margin and the cutting torque were not so large, however, the wall 49 provided at the distal end of the tool body 34 was damaged and the tip-mounting seat 34 was damaged from the rear end of the tool, resulting in a small number of drillable holes.

On the other hand, according to the drilling tool of the comparative examples 4 and 5 in which the angle of inclination β of the wall surface 34B of the tip-mounting seat 34 was reduced, the enlarged margin and the cutting torque were small similarly to the comparative example 3, however, the wall 49 was damaged, resulting in a significant shortened life of the tool. In addition, according to the drilling tools of the comparative examples 6 and 7 in which the angle of inclination β is increased, the tip 35 rattled during drilling, whereby the enlarged margin is increased, the cutting torque is varied excessively and moreover, the clamp screw 48 was damaged, resulting in a small number of the drillable holes.

Figure 22:
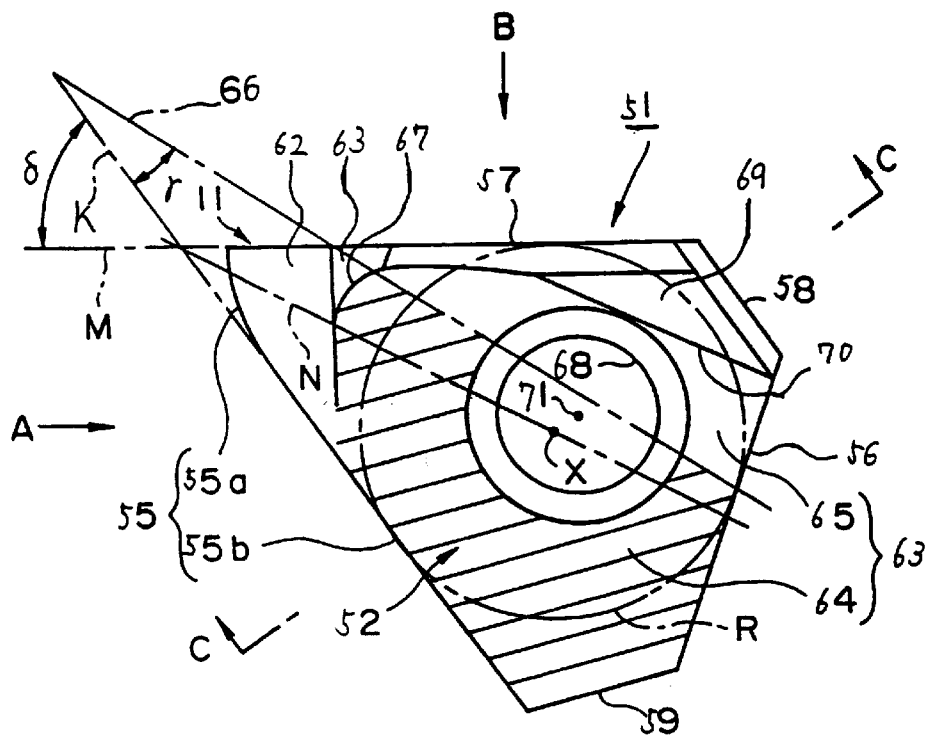
FIG. 22 is a plan view showing a first embodiment of a tip according to the present invention, as viewed from the direction opposite to one triangular surface 2 of a chip body 51.

Furthermore, FIGS. 22 to 26 show a first embodiment of the tip according to the present invention. In the tip of this embodiment, a tip body 51 is made of a hard material, such as a cemented carbide alloy, in the form of a substantially triangular plate, and a rake face 53 is formed on its one triangular surface 52, one of the side surfaces serves as a flank face 54, and a cutting edge 55 is formed along a crossing ridge between the rake face 53 and the flank face 54. However, a corner 58 at which two side surfaces 56 and 57 of the tip body 51 other than the side surface serving as the flank face 54 and a corner 59 at which the flank face 54 and the side surface 56 cross each other cross the side surfaces 56 and 57 and the flank face 54 and side surface 56, respectively, at an obtuse angle, as viewed from the direction opposite to the triangular surface 52, as shown in FIG. 22, that is, as viewed in plan adjacent to the one triangular surface 52 in a direction perpendicular to the other triangular surface 60 of the tip body 51, and are cut away in the direction perpendicular to the other triangular surface 60, whereby the tip body 51 strictly exhibits a shape of a partial pentagonal plane, similarly to the tips 5 and 35.

Figure 23:
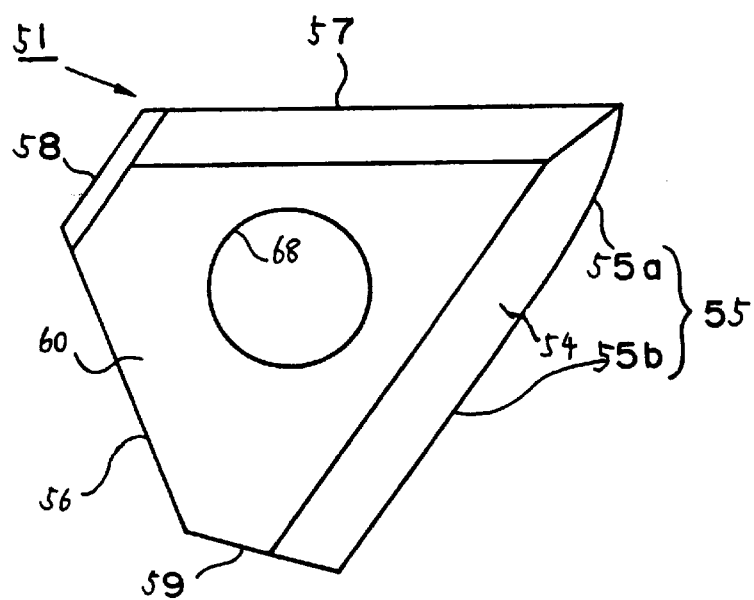
FIG. 23 is a diagram of the tip shown in FIG. 22, as viewed from the direction opposite to the other triangular surface 60 of the chip body 51.
Figure 27:
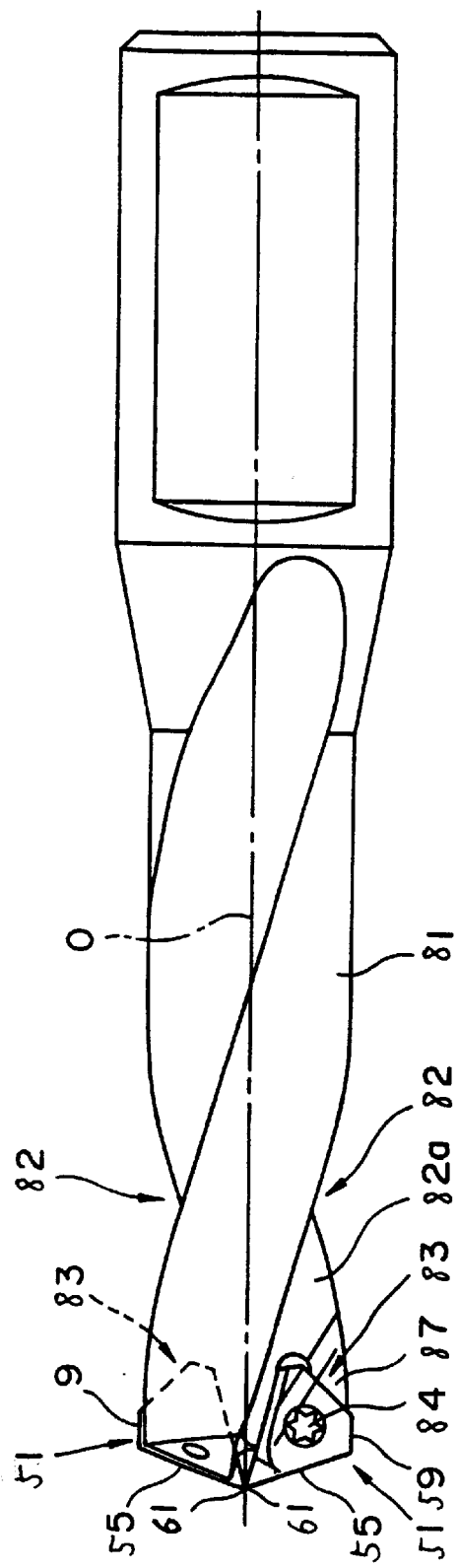
FIG. 27 is a plan view of a drilling tool to which the tip shown in FIG. 22 is attached.

On the other hand, the flank face 54 and the side surface 57 are disposed so as to cross at the remaining corner 61 of the tip body 51 at an acute angle, as shown in FIG. 23. However, on the rake face 53 of the one triangular surface 52 at the corner 61, there are formed, in the order along the side surface 57 from the pointed end of the corner 61, a cylindrical surface 62 which has a center line in parallel with the side surface 57 and the other triangular surface 60 and which proceeds toward the other triangular surface 60 while forming a convex curve as it proceeds towards the side surface 57, and a protruded surface 63 connected to the cylindrical surface 62 to gradually protrude as it is separated from the corner 61. One end 55a of the cutting edge 55 adjacent to the corner 61 is formed along a crossing ridge between the cylindrical surface 62 and the flank face 54, whereby the cutting edge 55 is formed in such a manner that the one end 55a adjacent to the corner 61 is formed into a shape of a convex circular arc, and the other end 55b proceeding from the one end 55a toward the corner 59 smoothly comes into contact with the one end 55a to form a linear shape extending in parallel with the other triangular surface 60, as viewed from the direction opposite to the flank face 54, as shown in FIG. 24.

Furthermore, according to this embodiment, on the rake face 53 connected to the other end 55b of the cutting edge 55, there is formed an inclined surface 64 which is inclined at a constant angle of inclination θ so as to proceed toward the other triangular surface 60 as it is separated from the cutting edge 55 to proceed toward the corner 58, and on the opposite side of the other end 55b of the cutting edge 55 via the inclined surface, there is formed a breaker wall surface 65 which is smoothly connected to the inclined surface 64 and which rises while drawing a convex curve as it is separated from the cutting edge 55. The ratio of the area of the inclined surface 64 to the area of the one triangular surface 52 is set to 30% or larger, as viewed from the direction opposite to the one triangular surface 52. In addition, the angle of inclination θ is set to the range of 5° to 20°.

Here, according to this embodiment, the area of the inclined surface 64 is defined as a projected area of a portion (cross-hatched portion in FIG. 22) surrounded by a tangent 66 between the inclined surface 64 and the breaker wall surface contacting the inclined surface 64, a crossing ridge 67 between the protruded surface 63 and the inclined surface 64, the other end 55b of the cutting edge 55, the corner 59 of the one triangular surface 52, and the side surface 56, as viewed from the direction opposite to the one triangular surface 52. However, a mounting hole 68 penetrating the tip body 51 perpendicular to the other triangular surface 60 to open at the one triangular surface 52 is formed in the tip body 51 of this embodiment, and an area of an opening of the mounting hole 68 is excluded from the areas of the triangular surface 52 and the inclined surface 64.

In addition, according to this embodiment, the inclined surface 64 is formed in such a manner that the width thereof in the direction perpendicular to the cutting edge 55, as viewed from the direction opposite to the one triangular surface 52, gradually increases as it proceeds from the corner 61 toward the corner 59, and the inclined surface 64 is inclined at a constant angle of inclination θ, whereby the inclined surface 64 is formed in such a manner that the depth thereof gradually increases as it proceeds from the corner 61 toward the corner 59 (side surface 56), that is, the inclined surface 64 is inclined so as to proceed toward the other triangular surface 60 as the tangent 66 proceeds from the corner 61 toward the corner 59 (side surface 56).

Furthermore, with the inclined surface 64 formed in this way, the tangent 66 between the inclined surface 64 and the breaker wall surface 65 will be extended in a direction to cross an extension K of the other end 55b of the cutting edge 55 adjacent to the corner 61, as viewed from the direction opposite to the one triangular surface 52. According to this embodiment, a crossing angle y between the tangent 66 and the extension K when viewed from the direction opposite to the one triangular surface 52 is set to be larger than one half of a crossing angle between the extension K and an extension M of the side surface 57 toward the corner 61, i.e., larger than one half of an internal angle δ of the corner 61 of the one triangular surface 52, and the tangent 66 is located toward the corner 58 from a bisector N of the internal angle δ.

Moreover, according to this embodiment, the breaker wall surface 65 is formed so as to form a shape of a concave circular-arc in cross section crossing perpendicularly to the cutting edge 55, and its radius of curvature is set so as to gradually increase from the corner 61 toward the corner 59 (side surface 56) with the tangent 66 being inclined so as to proceed toward the other triangular surface 60 as it proceeds from the corner 61 toward the corner 59 (side surface 56). In addition, a triangular flat surface 69 parallel to the other triangular surface 60 is left on the one triangular surface 52 adjacent to the corner 58 of the breaker wall surface 65. However, with the radius of curvature of the breaker wall surface 65 being set as described above, a crossing ridge 70 between the flat surface 69 and the breaker wall surface 65 will be also extended in a direction to cross the extension K adjacent to the corner 61 similarly to the tangent 66, as viewed from the direction opposite to the one triangular surface 52. Furthermore, according to this embodiment, the flat surface 69 is formed in such a manner that its height from the other triangular surface 60 is equal to the height of the cutting edge 55 to the other end 55b.

Incidentally, a center line 71 of the mounting hole 68 is disposed at a position off-centered toward the corner 58 from the center X of a circle R inscribed in the triangular surface 52, as viewed from the direction opposite to the one triangular surface 52, and the tangent 66 is disposed so as to pass on the center line 71, or toward the corner 58 from the center line 71, and at the same time, the crossing ridge 70 is disposed so as to substantially come into contact with a circle formed by the opening of the mounting hole 68 adjacent to the one triangular surface 52. In addition, the crossing ridge between the triangular surfaces 52 and 60 and the side surface 56 and 57, and the crossing ridge between the triangular surfaces 52, 60 and the corner 58 are chamfered, respectively. Furthermore, the tip of this embodiment is a positive tip in which the flank face 54 is inclined toward the inside (the corner 58) of the tip body 51 as it proceeds from the cutting edge 55 toward the other triangular surface 60, and a relief angle is given to the cutting edge. The cutting edge 55 is treated for honing.

The thus-formed tip of this embodiment is mounted on a tool body 81 of a throw-away drilling tool formed into a substantially columnar shape rotating around the axis O, as shown in FIGS. 27 to 30, and is used for drilling. That is, in the outer periphery of the tool body 81, a pair of chip discharge grooves 82 and 82, which are extending from the distal end of the tool body toward the rear end while twisting around the axis O rearward in a direction of rotation T of the tool, are formed on both sides of the axis O, and tip-mounting seats 83 are formed at distal ends of wall surfaces 82a of the chip discharge grooves 82 facing in the direction of rotation T of the tool. The tip of this embodiment is seated on the tip-mounting seat 83 such that the one triangular surface 52 is located to face in the direction of rotation T, and the cutting edge 55 is projected toward the distal end of the tool so that the corner 61 is located adjacent to the inner periphery of the distal end of the tool, and the corner 59 is located adjacent to the rear end outer periphery of the tool, and is fixed to the tip-mounting seat 83 by screwing the clamp screw 84 inserted through the mounting hole 68 into the tool body 84.

Incidentally, in the throw-away drilling tool shown in these drawings, the tip is mounted in such a manner that the other triangular surface 60 is inclined rearward in the direction of rotation T of the tool with respect to the axis O as it proceeds toward the rear end of the tool, as shown in FIG. 29, and at a portion of the wall surface 82a of the chip discharge groove 82 connected to the side surface 56 of the tip, a recess 87 is formed so as to be flush with the inclined surface 64 and the breaker wall surface 65 of the tip, or to be connected to the inclined surface 64 and the breaker wall surface 65 of the tip by being recessed by one step, and the recess 87 is formed of an inclined surface 85 inclined at a constant angle of inclination and a concave surface 86, which is circular-arc in cross section and rising in smooth connection to the inclined surface 85, so as to extend from the tip-mounting seat 83 toward the rear end outer periphery of the tool. In addition, the tip is mounted in such a manner that the corner 59 is in parallel with the axis O and the side surface 57 proceeds toward the outer periphery of the tool as it proceeds toward the rear end of the tool, whereby a wall 88 whose thickness gradually increases toward the rear end of the tool will be formed between the tip-mounting seats 83 and 83 of the pair of chip discharge grooves 82 and 82.

When drilling is performed by the thus-constructed throw-away drilling tool, chips produced by the cutting edge 55 of this embodiment are pressed against the protruded surface 64 from the cylindrical surface 63 to be curled into small size at portions produced by the convex-curved one end 55a of the cutting edge 55, while portions of the chips produced by the other end 55b of the cutting edge 55 receive resistance so as to be gradually curled while being brought into sliding contact with the inclined surface 64, and are further pressed against the breaker wall surface 65 to be rolled. In the tip constructed as described above, the inclined surface 64 with which the chips produced by the other end 55b of the cutting edge 55 are brought into sliding contact occupies 30% or more of the area of the one triangular surface 52 on which the rake surface 53 of the tip is formed, so that the width of the inclined surface 64 in an outflow direction of the chips, i.e., in a direction to intersect the cutting edge 55 at right angles, can be increased and therefore, a long outflow length of the chips on the inclined surface 64 can be ensured.

For this reason, according to the tip constructed as described above, even if slightly elongated chips are produced according to the drilling conditions, etc., such chips can be curled by being securely brought into sliding contact with the inclined surface 64 to give resistance, so that the chips can be prevented from passing over a breaker groove to flow out without being curled as in the conventional tool. On the other hand, since the chips receive the resistance to be gradually curled while being brought into sliding contact with the inclined surface 64 to flow, large resistance such that the outflow direction of the chips is suddenly changed is not exerted and therefore, cutting resistance exerted on the tool body 81 of the drilling tool during drilling can be reduced. Moreover, the inclined surface 64 inclined toward the other triangular surface 60 as it is separated from the cutting edge 55 is sufficiently ensured as described above, whereby a larger positive axial rake angle of the cutting edge 55 can be set, and a further reduction in the cutting resistance can be facilitated by increasing the cutting quality of the cutting edge 55, so that the rotational driving force of the tool body 81 is decreased, whereby more efficient drilling can be performed.

When the ratio of the area of the inclined surface 64 to the area of the triangular surface 52 is lower than 30% as viewed from the direction opposite to the one triangular surface 52, the outflow length of the chips cannot be sufficiently ensured, so that the chips to be produced slightly long may not be securely curled, or the outflow direction of the chips may be suddenly changed immediately after the chips have flown out, resulting in an increase in resistance. On the other hand, in the tip constructed as described above, the whole one triangular surface 52 may be the inclined surface 64, that is, the ratio of the area of the inclined surface 64 to the area of the one triangular surface 52 may be 100%. However, in order to roll more securely and favorably treat the chips that have been brought into sliding contact with the inclined surface 64 to be gradually curled, the breaker wall surface 65 having a shape of the concave surface smoothly connected to the inclined surface 64 to rise from the inclined surface 64 may preferably be formed on the opposite side of the cutting edge 55 via the inclined surface, as described in this embodiment. In this case, the ratio of the inclined surface 64 to the one triangular surface 52 may preferably be set to 60% at the maximum.

On the other hand, according to the drilling performed by the drilling tool as described above, the producing rate of the chips is high adjacent to the outer periphery of the tool because of the variations in the rotation diameter of the tool body 81 from the axis O, that is, slightly elongated chips are produced. On the contrary, according to the tip of this embodiment, the inclined surface 64 is formed in such a manner that the width and depth thereof gradually increase as it proceed from the corner 61 toward the corner 59 of the triangular surface 52, and the breaker wall surface 65 is formed in such a manner that the radius of curvature of the concave surface gradually increases toward the corner 59, and according to the above throw-away drilling tool, the thus-constructed tip is mounted such that the corner 61 is located on the inner periphery of the tool, the corner 59 is located on the rear end outer periphery of the tool, and the cutting edge 55 is projected. Therefore, according to this embodiment, by mounting the tip on the tool body 81 of the throw-away drilling tool as described above, it is possible to secure particularly the efficient width and depth of the inclined surface 64 on the outer periphery of the tool where the chips become slightly elongated, to moderate the change of the outflow direction made by the breaker wall surface, and to securely curl the chips while inhibiting the increase of the cutting resistance.

Moreover, according to the throw-away drilling tool constructed as described above, at a portion of the wall surface 82a of the chip discharge groove 82 of the tool body 81, a recess 87 is formed so as to be flush with the inclined surface 64 and the breaker wall surface 65 of the tip, or to be connected to the inclined surface 64 and the breaker wall surface 65 by being recessed by one step. The recess 87 is formed of the inclined surface 85 inclined at a constant angle and a concave surface 86, which is circular-arc in cross section and rising in smooth connection to the inclined surface 85, so as to extend from the tip-mounting seat 83 toward the rear end outer periphery of the tool. Therefore, according to the above throw-away drilling tool, chips curled by the inclined surface 64 and the breaker wall surface 65 of the tip can be smoothly and securely guided to the chip discharge groove 82 through the recess 87 and then discharged toward the rear end of the tool, whereby more efficient drilling can be achieved by preventing an increase in resistance during drilling caused by chip packing. However, when the inclined surface 64 and the breaker wall surface 65 are located in the direction of rotation T of the tool from the wall surface 82a of the chip discharge groove 82 by, for example, the other triangular surface 60 being arranged in parallel with the axis O of the tool body 81, the recess 87 may not be formed.

Incidentally, according to the tip of the above embodiment, the inclined surface 64 is inclined toward the other triangular surface 60 at a constant angle of inclination θ as it is separated from the cutting edge 55. However, the angle of inclination θ may be varied as the inclined surface 64 is separated from the cutting edge 55 by, for example, forming the inclined surface 64 into the shape of a concave surface similarly to the breaker wall surface 65. In this case, however, the radius of curvature of the inclined surface 64 may preferably be set to a small value in order to avoid the outflow direction of the chips from changing suddenly, and the radius of curvature may preferably be set smaller than at least the radius of curvature formed by the breaker wall surface 65 in a cross section intersecting the cutting edge 55 at right angles. In addition, the angle of inclination θ of the inclined surface 64 may be changed in the direction along the cutting edge 55 by, for example, forming the inclined surface 64 in such a manner that the angle of inclination θ gradually increases at the other end 55b of the cutting edge 55 as it proceeds from the corner 61 toward the corner 59.

Figure 32:
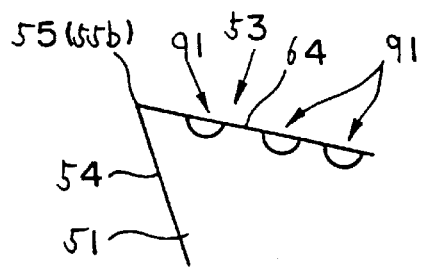
FIG. 32 is a sectional view taken along D—D in FIG. 31.
Figure 33:
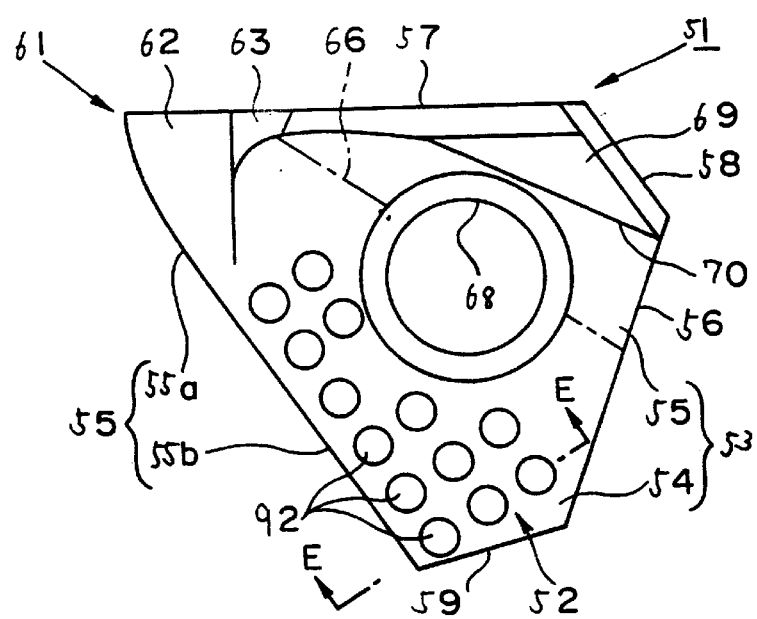
FIG. 33 is a plan view showing a third embodiment of a tip according to the present invention, as viewed from the direction opposite to one triangular surface 52 of a chip body 51.
Figure 34:
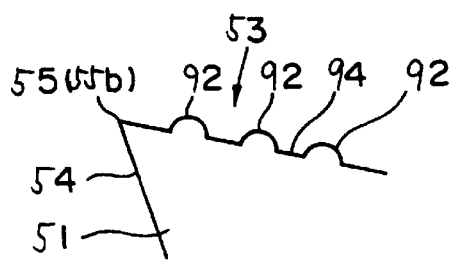
FIG. 34 is a sectional view taken along E—E in FIG. 33.

Furthermore, in order to achieve a further reduction of the cutting resistance exerting on the tool body 81 during drilling, a plurality of very small recesses 91 may preferably be formed in the inclined surface 64 as in a second embodiment of the tip according to the present invention shown in FIGS. 31 and 32, or a plurality of very small projections 92 may preferably be formed on the inclined surface 64 as in a third embodiment of the tip according to the present invention shown in FIGS. 33 and 34. In these embodiments, principal parts common to those of the tip of the first embodiment are indicated by the same reference numerals. Here, in the second embodiment, the recesses 91, each having a shape of a spherical concave surface, are arranged in a row in parallel with the cutting edge 55 and at equal intervals in the inclined surface 64 adjacent to the other end 55b of the cutting edge 55, and several recesses 91 are also formed so as to keep away from the mounting hole 68 in the inclined surface 64 opposite to the cutting edge 55 via these recesses 91 in a direction to intersect the cutting edge 55 at right angles. According to the third embodiment, the projections 92, each having a shape of a spherical convex surface, are formed in the arrangement similar to that of the recesses 91 in the second embodiment.

Therefore, in the thus-constructed tip of the second and third embodiments, even the slightly elongated chips can be securely curled while ensuring the outflow length of the chips by the inclined surface 64 similarly to the first embodiment, and the contact area between the inclined surface 64 and the chips is decreased by the recesses 91 and the projections 92, so that the cutting resistance to be exerted during drilling can be further reduced in cooperation with the fact that the outflow direction of the chips is not changed suddenly. While the recesses 91 and the projections 92 are arranged in a grid pattern, they may be arranged in zigzag form or arranged irregularly. In addition, the recesses 91 and the projections 92 may be formed into another shape, such as a shape of a concave conical surface or a shape of a convex conical surface, in addition to the spherical concave surface and the spherical convex surface.

TABLE 1

| | Axial rake angle α | Angle of inclination β | Number of drillable holes | Enlarged margin | Cutting torque |
|---|---|---|---|---|---|
| Example 1 | 7° | 10° | over 16000 | below 0.08 mm | 59 Nm |
| Example 2 | 10° | 15° | over 16000 | below 0.08 mm | 58 Nm |
| Example 3 | 15° | 20° | over 16000 | below 0.08 mm | 56 Nm |
| Comparative example 1 | 0° | 15° | below 10000 | below 0.16 mm | 63 Nm |
| Comparative example 2 | −7° | 15° | over 500 | below 0.40 mm | 68 to 83 Nm |
| Comparative example 3 | 20° | 15° | below 3000 | below 0.08 mm | 54 Nm |
| Comparative example 4 | 10° | 5° | below 500 | below 0.10 mm | 58 Nm |
| Comparative example 5 | 10° | 0° | below 100 | below 0.12 mm | 58 Nm |
| Comparative example 6 | 10° | 25° | below 800 | below 0.16 mm | 58 to 75 Nm |
| Comparative example 7 | 10° | 30° | below 500 | below 0.20 mm | 58 to 78 Nm |

What is claimed is:

1. A drilling tool comprising:
   a substantially columnar tool body rotatable about an axis;
   a chip discharge groove formed in an outer periphery of the tool body and opened at a distal end face of the tool body;
   a cutting edge having a rake face and extending from an end adjacent to the axis toward the outer periphery of the tool provided along a crossing ridge between a wall surface of the chip discharge groove facing in a circumferential direction of the tool and the distal end face; and
   a concave surface of the end of the tool body rising in the circumferential direction of the tool with respect to the rake face of the cutting edge, the concave surface forming a concave curve advancing toward the distal end face of the tool in the circumferential direction of the tool, the concave surface being formed between the crossing ridge and the distal end face,
   wherein the concave surface is connected to the rake face via a step portion of 1 mm or less.

2. A drilling tool according to claim 1, further comprising:
   a recess in the center of the distal end of the tool body between the ends of said cutting edges adjacent to said axis and extending toward a rear end of the tool along the axis;
   wherein a plurality of the cutting edges are provided on the tool body and the ends of the cutting edges adjacent to the axis are offset from the axis toward the circumferential direction of the tool, and
   wherein the concave surface extends toward the distal end of the tool while forming a concave curve from the outer periphery of the tool toward the axis so as to be connected to the bottom surface of the recess facing toward the distal end of the tool.

3. A drilling tool according to claim 1, wherein the concave surface is formed so that it is flush with the rake face of the cutting edge.

4. A drilling tool according to claim 1, wherein the concave surface is recessed by one step from the rake face.

5. A throw-away tip for use in drilling comprising:

a tip body formed as a substantially triangular plate, a first triangular surface of the tip body having a rake face formed thereon and one side surface of the tip body connected to the rake face serving as a flank face; and a cutting edge formed along a ridge between the rake face and the flank face, wherein a surface inclined toward a second triangular surface of the tip body is formed on the rake face, and wherein the ratio of the area of the first triangular surface to the area of the second triangular surface is at least 30%, as viewed in plan from a direction opposite to the first triangular surface.

6. A drilling tool comprising:

a substantially columnar tool body rotatable about an axis;

a pair of chip discharge grooves formed in an outer periphery of the tool body on both sides of the axis and opened at a distal end face of the tool body;

tip-mounting seats formed at respective distal ends of wall surfaces of the chip discharge grooves facing in a circumferential direction of the tool; and a pair of throw-away tips detachably mounted on the tip-mounting seats, the throw away tips having cutting edges located near a center of rotation of the tool of the distal end face of the tool body;

wherein the throw-away tips are formed as substantially triangular plates and are mounted to the tip-mounting seats such that triangular surfaces thereof are located as rake faces to face in the circumferential direction of the tool while forming a positive axial rake angle of 7° to 15° with respect to the axis, and side surfaces thereof are located to face the axis of the tool and abut wall surfaces of the tip-mounting seats facing the outer periphery of the tool, and wherein the wall surfaces of the tip-mounting seats facing the outer periphery of the tool incline toward the outer periphery of the tool while forming an angle of inclination of 10° to 20° with respect to the axis and toward a rear end of the tool.

7. A drilling tool according to claim 6, wherein side surfaces of the throw-away tips face the axis of the tool and are formed so that portions thereof adjacent to the distal end face of the tool extend at an obtuse angle as viewed from a direction opposite to the rake faces.

8. A drilling tool according to claim 6, wherein the ends of the cutting edges adjacent to the axis are offset from the axis toward the outer periphery of the tool near the center of rotation of the tool.

9. A throw-away tip for use in drilling according to claim 5, wherein a plurality of projections are formed on the inclined surface.

10. A throw-away tip for use in drilling according to claim 5, further comprising:

a breaker wall surface formed on the rake face on the opposite side of the cutting edge of the inclined surface and having a concave surface and being smoothly connected to the inclined surface to rise from the inclined surface.

11. A throw-away tip for use in drilling according to claim 5, wherein a plurality of recesses are formed on the inclined surface.

* * * * *